United States Patent [19]
Tobe et al.

[11] Patent Number: 5,850,117
[45] Date of Patent: Dec. 15, 1998

[54] VIBRATION ACTUATOR AND ADJUSTMENT METHOD THEREFOR

[75] Inventors: Michihiro Tobe; Tadao Takagi, both of Yokohama, Japan

[73] Assignee: Nikon Corporation, Tokyo, Japan

[21] Appl. No.: 664,124

[22] Filed: Jun. 14, 1996

[30] Foreign Application Priority Data

| Jun. 15, 1995 | [JP] | Japan | 7-148461 |
| Sep. 1, 1995 | [JP] | Japan | 7-224909 |
| Feb. 5, 1996 | [JP] | Japan | 8-018722 |

[51] Int. Cl.$^6$ ............................. H01L 41/09; H01L 41/04
[52] U.S. Cl. ........................................ 310/312; 310/323
[58] Field of Search .................... 310/323, 312, 310/313 D, 313 R, 330, 313 B

[56] References Cited

U.S. PATENT DOCUMENTS

| 4,454,639 | 6/1984 | Dworsky et al. | 29/25.35 |
| 4,498,025 | 2/1985 | Takahashi | 310/312 |
| 4,649,310 | 3/1987 | Nakamura et al. | 310/321 |
| 4,743,788 | 5/1988 | Takagi et al. | 310/316 |
| 4,812,697 | 3/1989 | Mishiro | 310/323 |
| 4,893,045 | 1/1990 | Honda | 310/323 |
| 4,914,337 | 4/1990 | Takagi | 310/316 |
| 4,965,482 | 10/1990 | Ohnishi et al. | 310/323 |
| 5,039,899 | 8/1991 | Yamaguchi | 310/323 |
| 5,061,882 | 10/1991 | Takagi | 318/116 |
| 5,101,132 | 3/1992 | Yamaguchi | 310/323 |
| 5,136,200 | 8/1992 | Takizawa et al. | 310/323 |
| 5,140,215 | 8/1992 | Yamaguchi | 310/323 |
| 5,162,708 | 11/1992 | Naito et al. | 318/116 |
| 5,191,688 | 3/1993 | Takizawa et al. | 29/25.35 |
| 5,200,665 | 4/1993 | Iijima | 310/323 |
| 5,359,251 | 10/1994 | Tsukimoto et al. | 310/323 |
| 5,416,375 | 5/1995 | Funakubo et al. | 310/323 |

FOREIGN PATENT DOCUMENTS

| 0-674 350 A1 | 9/1995 | European Pat. Off. . |
| 63-277477 | 11/1988 | Japan . |
| 4-91670 | 3/1992 | Japan . |
| 7-143771 | 6/1995 | Japan . |
| 7-241090 | 9/1995 | Japan . |
| 7-264882 | 10/1995 | Japan . |
| 8-140377 | 5/1996 | Japan . |

OTHER PUBLICATIONS

*Piezoelectric Linear Motors for Moving Optical Pickup*, pp. 393–398 (English translation attached).
*Ultrasonic Motors—Theory and Applications*, pp. 131–135, and pp. 191–196.
*Ultrasonic Motors* w/English translation, pp. 145–147.
Excerpt from White Series No. 132, "*Ultrasonic Motors*", ed. Torikeppsu, Dec. 20, 1991, pp. 145–147 [New Edition; Sadayuki Ueba, Yoshiroh Tomikawa].

*Primary Examiner*—Mark O. Budd
*Assistant Examiner*—Timothy A. Williams

[57] ABSTRACT

A vibration actuator is provided with a rectangular parallelepiped elastic member of which a surface bears electromechanical converting elements adhered thereto and a relative moving member maintained in pressure contact with the other surface of the elastic member. A driving voltage is applied to excite the electromechanical converting elements to generate, in the elastic member, a longitudinal vibration vibrating in a plane parallel to the surface of the elastic member contacting the relative moving member and a bending vibration vibrating in a direction crossing the contacting surface, thereby generating a relative motion between the elastic member and the relative moving member. The elastic member has working portions for adjusting the difference of the resonance frequencies of the longitudinal and bending vibrations.

10 Claims, 17 Drawing Sheets

BEFORE GRINDING

AFTER GRINDING

BEFORE ADJUSTMENT

AFTER ADJUSTMENT

BEFORE ADJUSTMENT

AFTER ADJUSTMENT

BEFORE MOUNTING

AFTER MOUNTING

VIBRATION ACTUATOR AND ADJUSTMENT METHOD THEREFOR

BACKGROUND OF THE INVENTION

1. Field of the Invention

The present invention relates to a vibration actuator and an adjusting method therefor.

2. Related Background Art

The vibration actuator, such as an ultrasonic actuator, is featured by a high torque, satisfactory controllability, a high retaining force and quietness, and can be divided into the annular type and the linear type. The annular vibration actuator is utilized, for example, for the auto focusing motor in a camera. Also in the linear vibration actuator, the following configuration is already known.

FIG. 20 is a schematic view showing a conventional linear vibration actuator.

In such conventional linear vibration actuator, a vibration generating transducer 102 is provided at an end of a rod-shaped elastic member 101, and a vibration limiting transducer 103 is provided at the other end. To the transducers 102, 103 there are respectively adhered vibration elements 102a, 103a. The vibration element 102a for vibration generation receives an alternating voltage from an oscillator 102b and generates vibration in the rod-shaped elastic member 101. The vibration propagates in the rod-shaped elastic member 101 to constitute a travelling wave, by which a movable member 104, maintained in pressure contact with the rod-shaped elastic member 101, is driven.

On the other hand, the vibration of the rod-shaped elastic member 101 is transmitted, through the vibration limiting transducer 103, to the vibration element 103a, which converts the energy of vibration into electrical energy. The vibration is absorbed by the consumption of the electrical energy by a load 103b connected to the vibration element 103a. The above-mentioned vibration limiting transducer 103 suppresses the reflection at the end face of the rod-shaped elastic member 101, whereby prevented is the generation of a standing wave in a mode intrinsic to the rod-shaped elastic member 101.

However the linear vibration actuator shown in FIG. 20 requires the rod-shaped elastic member 101 for the entire length of the moving range of the movable member 104, and such rod-shaped elastic member 101 has to be made to vibrate entirely. For this reason the apparatus becomes bulky, and there is required the vibration limiting transducer 103 for preventing the generation of the standing wave in the intrinsic mode.

For resolving such drawbacks, there have been proposed various self-controlled vibration actuators. An example of such actuators is the "longitudinal L1-bending B4 mode flat-plate motor" reported in the Lecture Papers in "the 5th Dynamics Symposium Related to Electromagnetic Force", as "222 Piezoelectric Linear Motors for Application to Driving a Light Pick-up Element".

FIGS. 21A to 21C are schematic views showing a conventional example of such longitudinal L1-bending B4 mode flat-plate motor and are respectively an elevation view, a lateral view and a plan view. Also FIG. 22 is a perspective view of such longitudinal L1-bending B4 mode flat-plate motor.

An elastic member 1 is composed of a planar rectangular base portion 1a, and driving force extracting portions 1b, 1c protruding from a face of the base portion 1a. Piezoelectric elements 2, 3, constituting electromechanical converting elements, are adhered on the other face of the base portion 1a of the elastic member 1, and serve to respectively generate a longitudinal vibration L1 mode and a bending vibration B4 mode. Piezoelectric elements 4, 5 serve as mechanoelectrical converting elements, for converting the mechanical energy (mechanical displacement) into an electrical energy, thereby detecting the amount of bending generated in the base portion 1a.

The driving force extracting portions 1b, 1c are provided in positions corresponding to the antinodes of the bending vibration B4 mode in the elastic member 1, and are pressed to a relative moving element 6 such as a rail.

This vibration actuator is so designed that the longitudinal vibration L1 mode and the bending vibration B4 mode, generated in the elastic member 1, have mutually very close intrinsic frequencies. Consequently, by the application of an alternating voltage of a frequency close to the two intrinsic frequencies to the piezoelectric elements 2, 3, the longitudinal vibration L1 mode and the bending vibration B4 mode are harmonized to generate an elliptic motion in the base portion 1a. The generated elliptic motion is taken out, through the driving force extracting portions 1b, 1c, as a propelling force relative to the relative moving member 6.

In the base portion 1a of the elastic member 1, the resonance frequencies in the longitudinal vibration 1st-order mode and in the bending vibration 4th-order mode are represented by:

Longitudinal vibration:

$$f_{L1} = \{1/(2\xi)\} \times (E/\rho)^{1/2} \tag{1}$$

Bending vibration:

$$f_{B4} = \{(\lambda_4 \xi)^2 \tau / (2\pi \xi^2)\} \times (E/12\rho)^{1/2} \tag{2}$$

wherein:

E: Young's modulus

ρ: density

ξ: equivalent length of elastic member 1 (equivalent in length to a completely rectangular elastic member)

τ: equivalent thickness of elastic member 1 (equivalent in thickness to a completely rectangular elastic member)

$\lambda_4 \xi = 14.137166$

As indicated by the equations (1) and (2), the thickness τ of the elastic member 1 affects the resonance frequency of the bending vibration, but does not affect that of the longitudinal vibration. Also the length ξ of the elastic member 1 affects both resonance frequencies, but with different magnitudes since ξ appears in the first order in the longitudinal vibration and in the second order in the bending vibration.

For obtaining highly efficient driving characteristics, the resonance frequencies of the longitudinal vibration and the bending vibration have to be mutually sufficiently close in such a manner, for example, that the difference of the resonance frequencies does not exceed 1% of the driving frequency. However, for example because of a dimensional error in the manufacture, the difference of the resonance frequencies of both vibrations may exceed the design value. Consequently, in the manufacture of the ultrasonic actuator shown in FIGS. 21A to 21C and 22, it is necessary to adjust the difference of the resonance frequencies of the vibrations with a predetermined range, by measuring the resonance frequencies of both vibrations after the assembly of the elastic member 1 and applying a suitable work on the elastic member 1 according to the result of measurement.

As indicated by the equations (1) and (2), the shape parameters relating to the resonance frequencies are the equivalent thickness τ and the equivalent length ξ of the elastic member 1. Consequently the work on the elastic member 1 may be made in two ways, namely on the equivalent thickness τ or on the equivalent length ξ. Also the simplest work applicable is grinding of the elastic member 1. Consequently there can be conceived the reduction of the equivalent thickness τ and that of the equivalent length ξ by grinding the elastic member 1.

A reduction in the equivalent thickness τ by grinding the elastic member 1 allows to vary only the resonance frequency of the bending vibration in a simple manner. However such grinding is not adequate for the frequency adjustment, because it is difficult to grind the elastic member 1 only as it is provided, on a face thereof, with the piezoelectric elements 2, 3 as shown in FIGS. 21A to 22.

On the other hand, a reduction in the equivalent length ξ elevates the resonance frequencies of both longitudinal vibration and bending vibration, but can vary the difference of the two resonance frequencies since that of the bending vibration varies by a larger amount. In order to reduce the difference of the two resonance frequencies by the reduction of the equivalent length ξ, it is necessary, prior to the grinding work, to set the resonance frequency of the longitudinal vibration larger than that of the bending vibration.

For reducing the equivalent length ξ by working the elastic member 1, S. Ueba and Y. Tomikawa reported ("Ultrasonic Actuator", rev. edition, p. 103, Triceps Press) the reduction of the difference of the resonance frequencies of both vibrations by the adjustment of the equivalent length ξ of the elastic member 1 in an ultrasonic actuator utilizing the longitudinal vibration 1st-order mode and the bending vibration 8th-order mode.

It is thus customary, in the adjustment of the resonance frequencies of the vibration actuator utilizing the longitudinal and bending vibrations, to adjust the equivalent length ξ of the elastic member by grinding the end faces, in the longitudinal direction, of the elastic member.

In such adjustment, in order to obtain an ideal vibration mode, the equivalent length ξ of the elastic member 1 has to be strictly uniform in the longitudinal direction.

However, as the transversal cross section of such longitudinal-bending vibration actuator has a rectangular shape which is shorter in the direction of thickness, it is necessary to grind a relative large area for the adjustment of the equivalent length ξ. It is in practice considerably difficult, therefore, to realize a uniform equivalent length ξ in the elastic member by such grinding work.

For this reason there results a drawback that the equivalent length ξ of the elastic member 1 does not become uniform in the longitudinal direction, and the vibration modes of the longitudinal and bending vibrations vary in shape, thereby deteriorating the driving characteristics.

Also the grinding work of the end faces of the elastic member 1 is usually done with a grinding tool such as a grinder, but the grinding work of a relative large area with such tool may detrimentally affect the piezoelectric elements 2, 3 adhered on a face of the elastic member 1 or may distort the elastic member 1, thus deteriorating the planarity of the plane of the driving force extracting portions 1b, 1c (contact surface with the relative moving member 6) and lowering the driving efficiency.

SUMMARY OF THE INVENTION

In consideration of the foregoing, the object of the present invention is to provide a vibration actuator enabling easy and secure adjustment of the resonance frequencies of the applied longitudinal and bending vibrations, and an adjustment method therefor.

According to a first aspect of the present invention, the above-mentioned object can be attained by a vibration actuator provided with a rectangular parallelopiped elastic member of which a surface bears electromechanical converting elements adhered thereto, and a relative moving member maintained in pressure contact with the other surface of the elastic member, wherein a driving voltage is applied to excite the electromechanical converting elements to generate, in the elastic member, a longitudinal vibration vibrating in a plane parallel to the surface of the elastic member contacting the relative moving member and a bending vibration vibrating in a direction crossing the contacting surface, thereby generating a relative motion between the elastic member and the relative moving member, the elastic member comprising working portions for adjusting the difference in the resonance frequencies of the longitudinal and bending vibrations.

According to a second aspect of the present invention, there is provided a vibration actuator provided with a rectangular parallelopiped elastic member of which a surface bears electromechanical converting elements adhered thereto and a relative moving member maintained in pressure contact with the other surface of the elastic member, wherein a driving voltage is applied to excite the electromechanical converting elements to generate, in the elastic member, a longitudinal vibration vibrating in a plane parallel to the surface of the elastic member contacting the relative moving member and a bending vibration vibrating in a direction crossing the contacting surface, thereby generating a relative motion between the elastic member and the relative moving member, the elastic member comprising frequency adjusting portions protruding from the end faces, in the longitudinal direction, of the elastic member and adapted to be reduced in the length in the longitudinal direction, thereby adjusting the difference in the resonance frequencies of the longitudinal and bending vibrations. In such configuration, the frequency adjusting portions are preferably provided symmetrically with respect to the center line of the elastic member which is parallel to the longitudinal direction thereof.

According to a third aspect of the present invention, there is provided a vibration actuator provided with a rectangular parallelopiped elastic member of which a surface bears electromechanical converting elements adhered thereto and a relative moving member maintained in pressure contact with the other surface of the elastic member, wherein a driving voltage is applied to excite the electromechanical converting elements to generate, in the elastic member, a longitudinal vibration vibrating in a plane parallel to the surface of the elastic member contacting the relative moving member and a bending vibration vibrating in a direction crossing the contacting surface, thereby generating a relative motion between the elastic member and the relative moving member, the elastic member comprising mass lacking portions provided on end faces and/or lateral faces, in the longitudinal direction, of the elastic member and adapted to reduce the mass of the elastic member, thereby adjusting the difference in the resonance frequencies of the longitudinal and bending vibrations. In such configuration, the mass lacking portions on the lateral faces are provided in positions corresponding to the antinodes of the bending vibration.

According to a fourth aspect of the present invention, there is provided an adjusting method for a vibration actuator in which a driving voltage is applied to excite electromechanical converting elements adhered to a surface of a rectangular parallelopiped elastic member to generate a longitudinal vibration vibrating in a plane parallel to the other surface of the elastic member contacting a relative moving member maintained in pressure contact with the other surface and a bending vibration vibrating in a direction crossing the contacting surface, thereby generating a relative motion between the elastic member and the relative moving member, the adjusting method comprising the step of working the elastic member thereby adjusting the difference in the resonance frequencies of the longitudinal and bending vibrations.

According to a fifth aspect of the present invention, there is provided an adjusting method for a vibration actuator in which a driving voltage is applied to excite electromechanical converting elements adhered to a surface of a rectangular parallelopiped elastic member to generate a longitudinal vibration vibrating in a plane parallel to the other surface of the elastic member contacting a relative moving member maintained in pressure contact with the other surface and a bending vibration vibrating in a direction crossing the contacting surface, thereby generating a relative motion between the elastic member and the relative moving member, the adjusting method comprising the step of reducing the length, in the longitudinal direction, of frequency adjusting portions provided on the end faces, in the longitudinal direction, of the elastic member, thereby adjusting the difference in the resonance frequencies of the longitudinal and bending vibrations. In such method, it is preferable that the adjustment of the difference in the resonance frequencies of the longitudinal and bending vibrations is such made that the resonance frequency of the longitudinal vibration is higher than that of the bending vibration. Also the frequency adjusting portions are preferably provided symmetrically with respect to the center line of the elastic member which is parallel to the longitudinal direction thereof.

According to a sixth aspect of the present invention, there is provided an adjusting method for a vibration actuator in which a driving voltage is applied to excite electromechanical converting elements adhered to a surface of a rectangular parallelopiped elastic member to generate a longitudinal vibration vibrating in a plane parallel to the other surface of the elastic member contacting a relative moving member maintained in pressure contact with the other surface and a bending vibration vibrating in a direction crossing the contacting surface, thereby generating a relative motion between the elastic member and the relative moving member, the adjusting method comprising the step of providing on the end faces and/or the lateral faces, in the longitudinal direction, of the elastic member, with mass lacking portions for reducing the mass of the elastic member, thereby adjusting the difference in the resonance frequencies of the longitudinal and bending vibrations. In such method, it is preferable that the mass lacking portions, if provided on the lateral faces, are provided in positions corresponding to the antinodes of the bending vibration.

According to the first to sixth aspects of the present invention mentioned above, the equivalent length of the elastic member constituting the vibration actuator can be easily reduced without deterioration in the performance thereof, as the elastic member is provided with working portions (i.e. protruding frequency adjusting portions or mass lacking portions) for frequency adjustment. Such reduction of the equivalent length varies the resonance frequency of the longitudinal vibration and that of the bending vibration with mutually different rates of increase.

Consequently, (1) if the resonance frequency of the longitudinal vibration is much larger than that of the bending vibration prior to the formation of the working portions, the working is so conducted that the rate of increase of the resonance frequency of the longitudinal vibration is smaller than that of the bending vibration, and (2) if the resonance frequency of the longitudinal vibration is smaller than that of the bending vibration prior to the formation of the working portions, the working is so conducted that the rate of increase of the resonance frequency of the longitudinal vibration is larger than that of the bending vibration, whereby the difference between the resonance frequencies of the longitudinal and bending vibrations can be reduced.

In the present specification, the term "work" means a work capable of reducing the equivalent length $\xi$ of the elastic member by reducing the mass of a part of the elastic member or the mass of frequency adjusting portions or a part thereof provided in the elastic member, and includes, for example, a grinding work and a hole making work.

According to a seventh aspect of the present invention, there is provided a vibration actuator provided with a rectangular parallelopiped elastic member, electromechanical converting elements adhered to a surface of the elastic member, and a relative moving member maintained in pressure contact with the other surface of the elastic member, wherein generated are a longitudinal vibration vibrating in a plane parallel to the surface of the elastic member contacting the relative moving member and a bending vibration vibrating in a direction crossing the contacting surface, thereby generating a relative motion between the elastic member and the relative moving member, the vibration actuator comprising frequency adjusting members mounted on the end faces and/or the lateral faces, in the longitudinal direction, of the elastic member.

According to an eighth aspect of the present invention, there is provided an adjusting method for a vibration actuator in which a driving voltage is applied to excite electromechanical converting elements adhered to a surface of a rectangular parallelopiped elastic member to generate a longitudinal vibration vibrating in a plane parallel to the other surface of the elastic member contacting a relative moving member maintained in pressure contact with the other surface and a bending vibration vibrating in a direction crossing the contacting surface, thereby generating a relative motion between the elastic member and the relative moving member, the adjusting method comprising the step of mounting frequency adjusting members on the end faces and/or the lateral faces, in the longitudinal direction, of the elastic member, thereby matching or bringing close the resonance frequencies of the longitudinal and bending vibrations. In such method, it is preferable that the mounting of the frequency adjusting members is conducted by forming mounting holes for mounting the frequency adjusting members on the end faces, in the longitudinal direction, of the elastic member, and mounting the frequency adjusting members in the mounting holes. It is also preferable that after the mounting of the frequency adjusting members in the mounting holes, a mass reducing work is effected on a part of the frequency adjusting members.

According to the seventh and eighth aspects of the present invention, the resonance frequencies of the longitudinal and bending vibrations can be securely adjusted without the deterioration of the performance of the vibration actuator resulting from the frequency adjustment, by in advance providing the end faces in the longitudinal direction of the elastic member with the mounting holes for the frequency adjusting members and mounting the frequency adjusting members of various masses, under suitable selection, into such mounting holes thereby varying the equivalent length of the elastic member.

In the present specification, the term "mounting hole for frequency adjusting member" means a hole in which the frequency adjusting member can be fitted, and can be a threaded hole if the frequency adjusting member is a screw or a bolt, or a pin hole if the frequency adjusting member is a pin. A finer frequency adjustment is made possible by varying the length or weight of such screw, bolt or pin or the screwed length thereof.

The above and other objects, features and advantages of the present invention will be explained hereinafter and may be better understood by reference to the drawings and the descriptive matter which follows.

DETAILED DESCRIPTION OF THE PREFERRED EMBODIMENTS

The vibration actuator of the present invention will be clarified by embodiments thereof in the form of an ultrasonic actuator utilizing the vibrations in the ultrasonic range.

First embodiment

Figure 1:
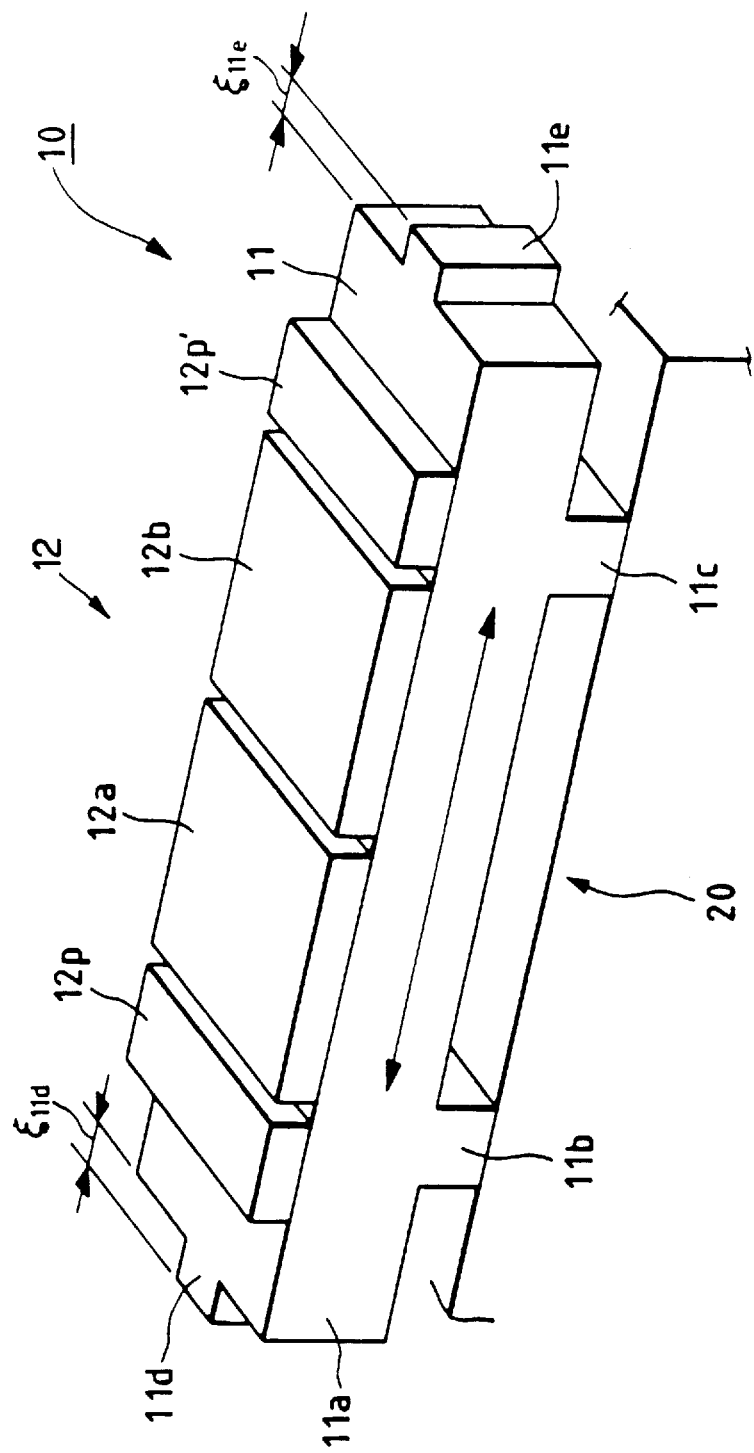
FIG. 1 is a perspective view of an ultrasonic actuator constituting a first embodiment of the present invention.

FIG. 1 is a perspective view of an ultrasonic actuator constituting a first embodiment of the present invention.

The ultrasonic actuator of the present invention is composed of an elastic member 11, a piezoelectric element 12 connected to a surface of the elastic member, and a relative moving member 20 such as a rail or a roller, maintained in pressure contact with driving force extracting portions 11$b$, 11$c$ protruding from the other surface of the elastic member 11.

The elastic member 11 is composed of a rectangular parallelopiped base portion 11$a$, and driving force extracting portions 11$b$, 11$c$ protruding from the lower surface of the base portion 11$a$ for obtaining the driving force. These driving force extracting portions 11$b$, 11$c$ are positioned corresponding to the antinodes (positions with maximum amplitude) of the bending vibration generated in the driven state.

The piezoelectric element 12 is an electromechanical converting element for converting an electrical signal into a mechanical displacement, and, in the present embodiment, includes driving piezoelectric elements 12$a$, 12$b$ and vibration monitoring piezoelectric elements 12$p$, 12$p'$, which are mounted on the elastic member 11 for example by adhesion.

Though not illustrated, sliding materials may be adhered on the bottom surfaces of the driving force extracting portions 11$b$, 11$c$ in order to suppress the sliding resistance between the driving force extracting portions 11$b$, 11$c$ and the relative moving member 20.

The driving piezoelectric elements 12$a$, 12$b$, receiving alternating voltages with a mutual difference in the electrical phase by 90°, generates, in the elastic member 11, a longitudinal vibration (L1 mode in the present embodiment) and a bending vibration (B4 mode in the present embodiment), thereby generating, in the driving force extracting portions 11$b$, 11$c$, a driving force by an elliptic motion by the synthesis of these two vibration modes.

The vibration monitoring piezoelectric elements 12*p*, 12*p*' are mechanoelectrical converting elements for converting a mechanical displacement into an electrical signal, and monitor the state of the vibrations generated in the elastic member 11, for supply to a control circuit 35 to be explained later.

Though not illustrated, the elastic member 11 is commonly connected to the ground potential, and an electrode (common electrode) therefor can be realized for example by soldering a lead wire to the elastic member 11 or adhering a metal foil with a lead wire to the elastic member 11.

In the present embodiment, there are further provided frequency adjusting portions 11*d*, 11*e* with a rectangular cross section, symmetrically to the center line parallel to the longitudinal direction (indicated by a two-ended arrow) of the rectangular parallelepiped elastic member 11. In the present embodiment, the frequency adjusting portions 11*d*, 11*e* are formed integrally with the base portion 11*a*, but they may also be formed separately and connected to the base portion 11*a* by suitable means. The frequency adjusting portions 11*d*, 11*e* are formed over the entire thickness of the base portion 11*a*.

These frequency adjusting portions 11*d*, 11*e* are adapted to be ground for reducing the lengths $\xi_{11d}$, $\xi_{11e}$ in the longitudinal direction of the elastic member 11, whereby the equivalent length $\xi$ of the elastic member 11 can be reduced without any change in the longitudinal length of the base portion 11*a*, and there can be adjusted the difference in the resonance frequencies of the longitudinal vibration mode and the bending vibration mode, generated in the elastic member 11 in the driven state of the ultrasonic actuator.

More specifically, a reduction in the lengths $\xi_{11d}$, $\xi_{11e}$ of the frequency adjusting portions 11*d*, 11*e* reduces the equivalent length from $\xi$ to ($\xi-\Delta\xi$) according to the equations (1) and (2). The resonance frequencies of the longitudinal and bending vibrations, determined from the equations (1) and (2) both increase, but the rate of increase is larger in the resonance frequency of the bending vibration in which the equivalent length $\xi$ is a higher order.

Figure 2A:
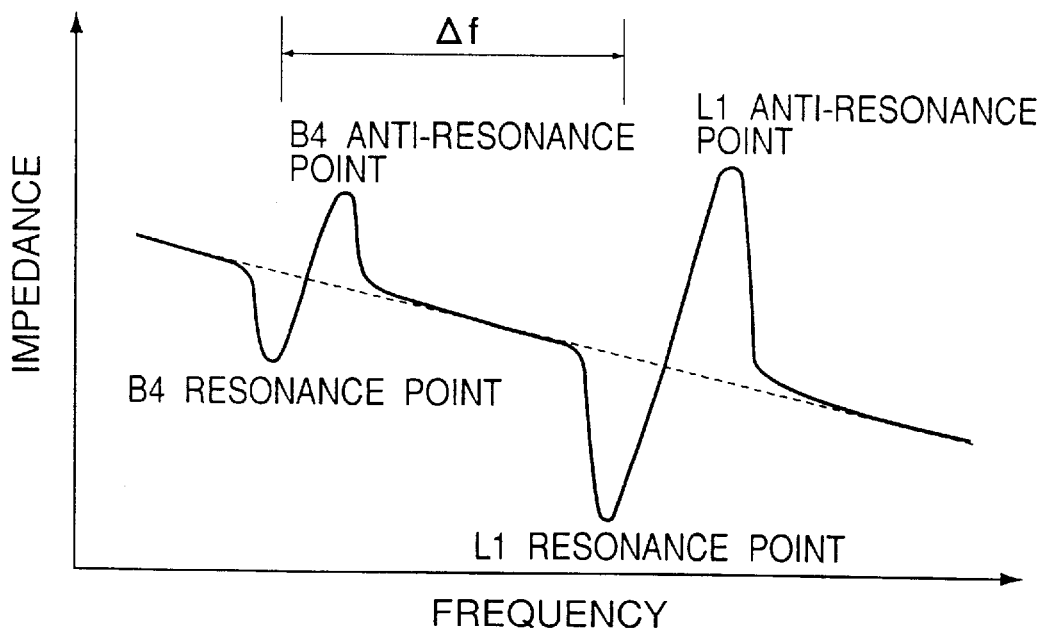
FIGS. 2A and 2B are graphs showing an example of the variation in the resonance frequencies of the longitudinal and bending vibrations in the first embodiment, by the relationship between the frequency and impedance of the elastic member, respectively prior to and after the grinding of the frequency adjusting portion.
Figure 2B:
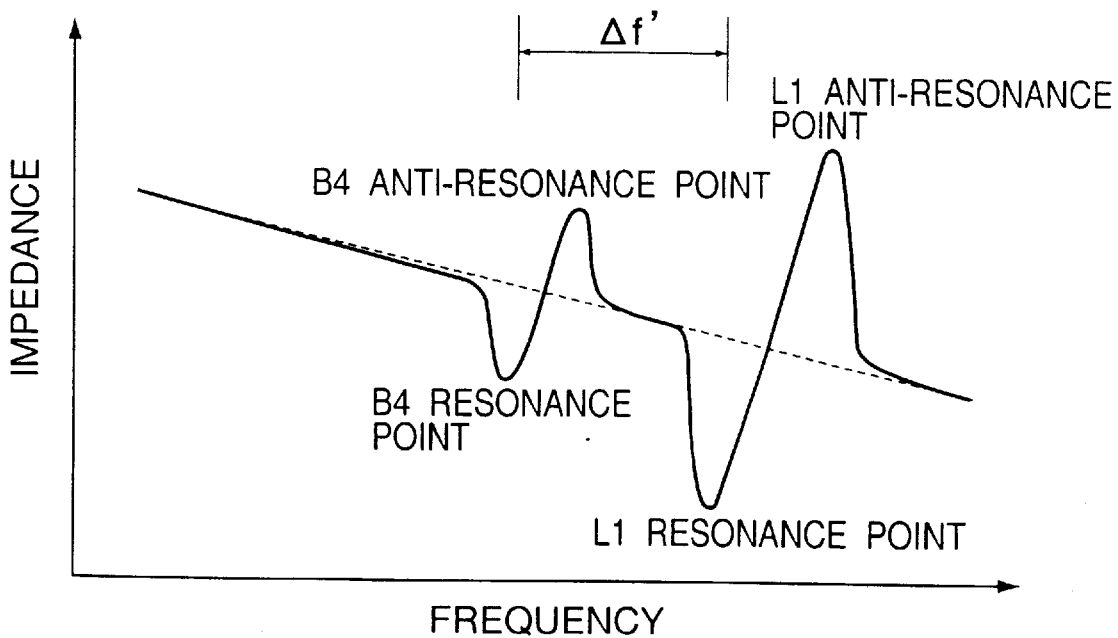

FIGS. 2A and 2B are graphs showing an example of the variation in the resonance frequencies of the longitudinal and bending vibrations, by the relationship between the frequency and the impedance of the elastic member 11, respectively prior to and after the grinding of the frequency adjusting portions 11*d*, 11*e*.

The difference between the resonance frequency of the bending vibration (B4 mode) and that of the longitudinal vibration (L1 mode) prior to the grinding is $\Delta f$, but both resonance frequencies increase by the grinding, with a larger increase rate for the resonance frequency of the bending vibration (B4 mode) than for that of the longitudinal vibration (L1 mode) whereby the difference varies to $\Delta f'$ ($<\Delta f$). Thus the adjustment is so made that the difference of the resonance frequencies of the longitudinal and bending vibrations decreases.

Figure 3:
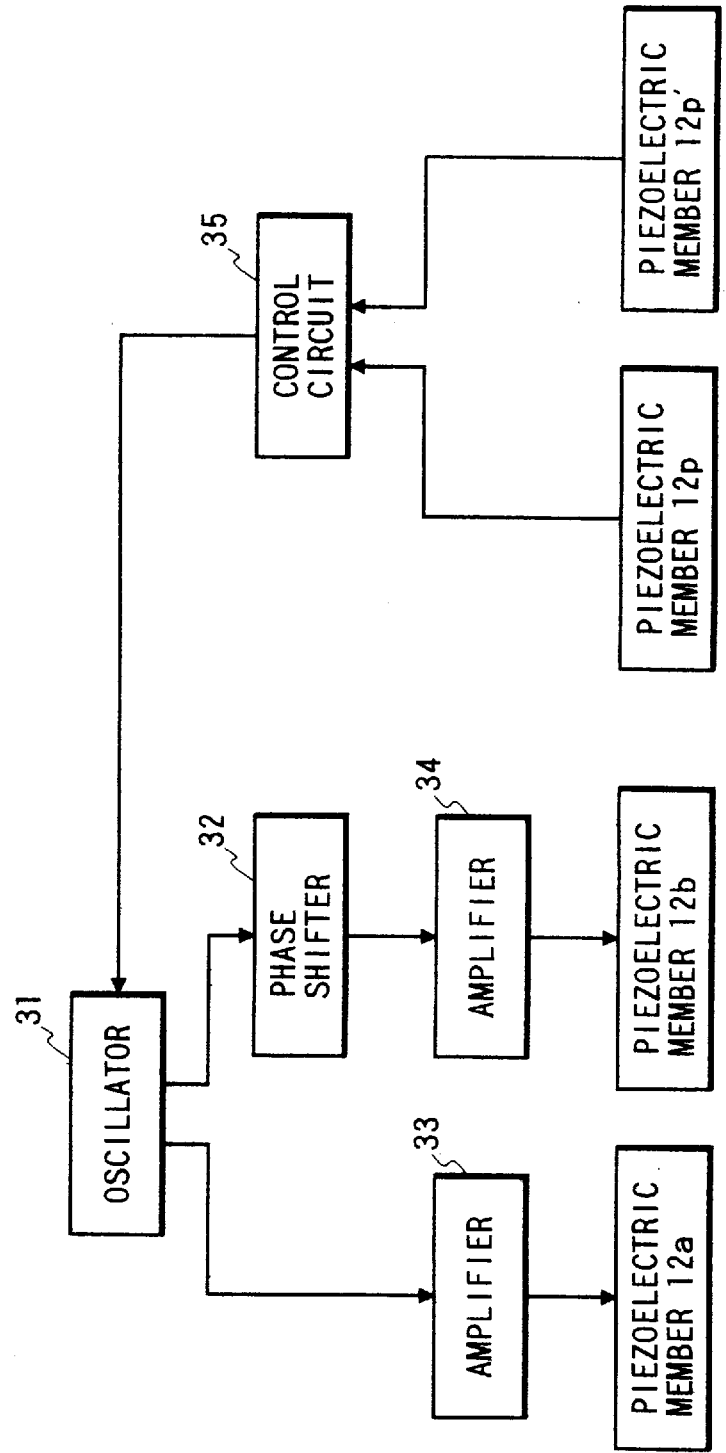
FIG. 3 is a block diagram showing an example of the driving circuit of the ultrasonic actuator of the first embodiment.

FIG. 3 is a block diagram showing an example of the configuration of the driving circuit for the ultrasonic actuator 10 shown in FIGS. 1, 2A and 2B.

An oscillator 31 generates a signal of a frequency corresponding to the 1st-order longitudinal vibration and the 4th-order bending vibration of the vibrating member 11, consisting of the elastic member 11 and the piezoelectric element 12. The output of the oscillator 31 is branched, and an output is amplified by an amplifier 33 and is supplied, as an A-phase voltage, to an electrode of the driving piezoelectric member 12*a*. The other of the branched output is subjected to a phase shift by $\pi/2$ in a phase shifter 32, and supplied as a B-phase voltage, to an electrode of the driving piezoelectric element 12*b* through an amplifier 34.

A control circuit 35 receives the output voltages of the vibration monitoring piezoelectric elements 12*p*, 12*p*' for comparison with a predetermined reference voltage, and controls the oscillator 31 in such a manner as to lower or elevate the frequency respectively if the outputs of the terminals p, p' are smaller or larger. Thus the vibration amplitude of the ultrasonic actuator 10 is maintained within a predetermined magnitude.

Figure 4:
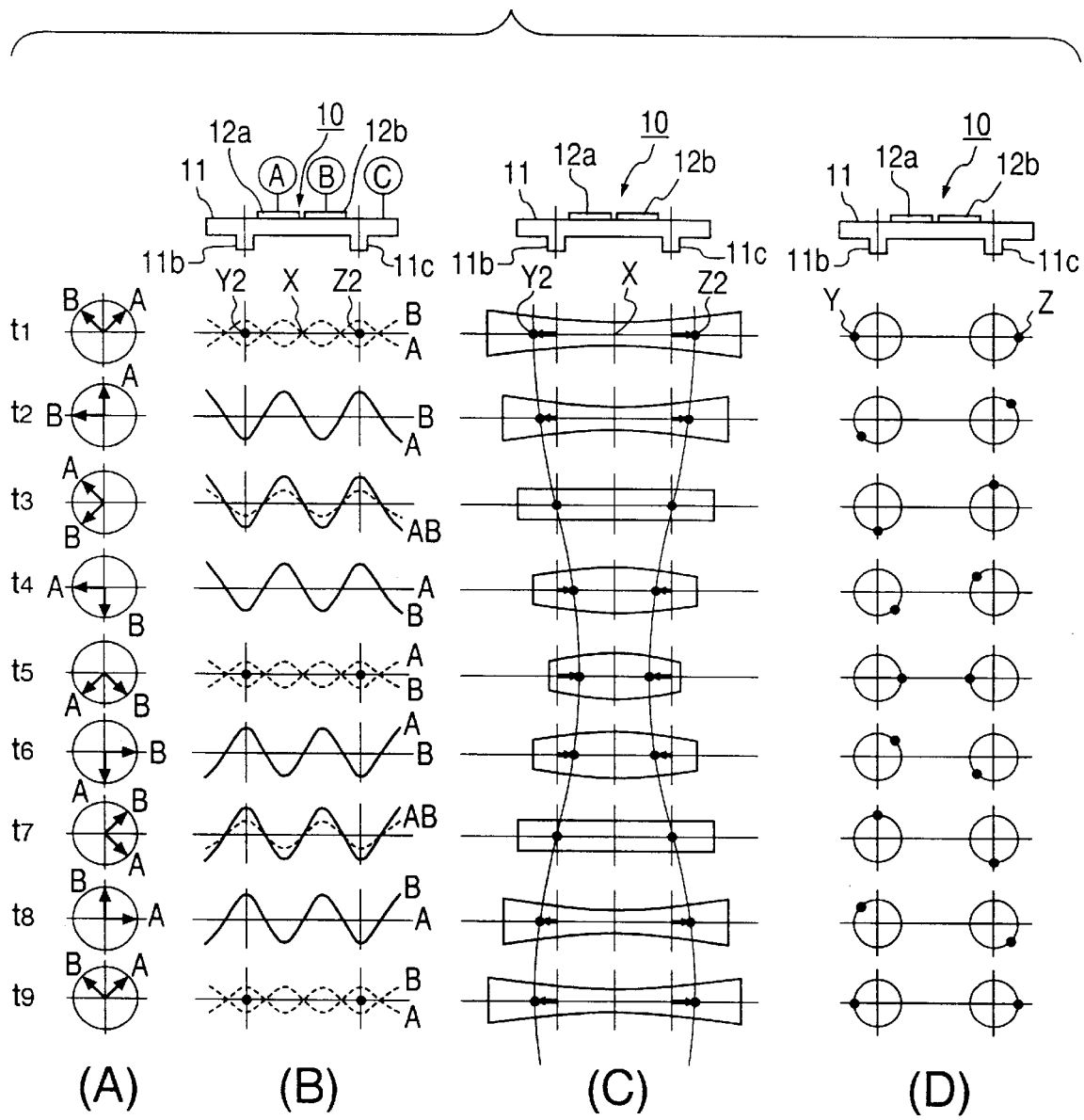
FIG. 4 is a view showing the function of the ultrasonic actuator of the first embodiment.

FIG. 4 is a view showing the function of the ultrasonic actuator 10 in FIG. 1, which generates a composite vibration of the bending vibration and the longitudinal vibration by the application of alternating voltages, mutually different in phase by 90°, to the driving piezoelectric members 12*a*, 12*b*, thereby generating an elliptic motion at the ends of the driving force extracting portions 11*b*, 11*c* of the elastic member 11. The elastic member 11 is maintained, through the driving force extracting portions 11*b*, 11*c*, in pressure contact with the relative moving member 20 to obtain a driving force therein.

In the present embodiment, the driving piezoelectric members 12*a*, 12*b* are so polarized that their polarities are in a same direction while the applied high-frequency voltages A, B mutually have a phase difference of $\pi/2$ in time, but such factors are not limitative and the driving piezoelectric members 12*a*, 12*b* may be polarized in the mutually opposite directions.

In FIG. 4, a column (A) indicates the change in time of the 2-phase high-frequency voltages A, B supplied to the ultrasonic actuator, over a time $t_1$ to $t_9$, with the abscissa indicating the effective value of the high-frequency voltage. A column (B) indicates the variation in the cross section of the ultrasonic actuator, corresponding to the variation in time ($t_1$–$t_9$) of the bending vibration generated in the ultrasonic actuator. A column (C) indicates the variation in the cross section of the ultrasonic actuator, corresponding to the variation in time ($t_1$–$t_9$) of the longitudinal vibration generated therein. A column (D) indicates the variation in time ($t_1$–$t_9$) of the elliptic motion generated in the driving force extracting portions 11*b*, 11*c* of the ultrasonic actuator.

In the following there will be explained the function of the ultrasonic actuator 10 of the present embodiment, following the lapse of time from $t_1$ to $t_9$.

At a time $t_1$, as shown in the column (A), the high-frequency voltages A and B assume a same positive value, so that, as shown in the column (B), the bending motions by the voltages A and B mutually cancel, and mass points Y1 and Z1 have a zero amplitude. Also as shown in the column (C), the longitudinal vibrations by the high-frequency voltages A, B occur in the extending direction, so that mass points Y2 and Z2 show maximum elongations around the node X, as indicated by arrows. As a result, as indicated by the column (D), the both vibrations are combined, so that the motion of a mass point Y is represented by the synthesis of the motions of the mass points Y1 and Y2 while the motion of a mass point Z is represented by the synthesis of the motions of the mass points Z1 and Z2.

At a time $t_2$, the high-frequency voltage B becomes zero and the high-frequency voltage A assumes a positive value as shown in the column (A). Thus, as shown in the column (B), a bending motion is generated by the voltage A, whereby the mass point Y1 moves in the negative direction and the mass point Z1 moves in the positive direction. Also as shown in the column (C), a longitudinal vibration is generated by the voltage A, so that the distance between the mass points Y2 and Z2 becomes smaller than at the time $t_1$. As a result, as shown in the column (D), the both vibrations are synthesized and the mass points Y and Z move counterclockwise from the state at the time $t_1$.

At a time $t_3$, the high-frequency voltages A and B respectively assume a positive value and a same negative value as shown in the column (A). As shown in the column (B), the bending motions by the voltages A and B are synthesized and amplified, whereby the mass point Y1 is more shifted in the negative direction than at the time $t_2$ and assumes the maximum negative amplitude. Also the mass point Z1 is more shifted in the positive direction than at the time $t_2$ and assumes the maximum positive amplitude. Also as shown in the column (C), the longitudinal vibrations by the voltages A and B mutually cancel, so that the mass points Y2 and Z2 return to the original positions. As a result, as shown in the column (D), both vibrations are synthesized and the mass points Y and Z move counterclockwise from the state at the time $t_2$.

At a time $t_4$, the high-frequency voltage A becomes zero while the high-frequency voltage assumes a negative value as shown in the column (A). As shown in the column (B), a bending vibration is generated by the voltage B, whereby the mass points Y1 and Z1 show smaller amplitudes than at the time $t_3$. Also as shown in the column (C), a longitudinal vibration is generated by the voltage B, whereby the distance of the mass points Y2 and Z2 contracts. As a result, as shown in the column (D), both vibrations are synthesized and the mass points Y and Z move counterclockwise from the state at the time $t_3$.

At a time $t_5$, the high-frequency voltages A and B assume a same negative value as shown in the column (A). As shown in the column (B), the bending motions by the voltages A and B mutually cancel, so that the mass points Y1 and Z1 have a zero amplitude. Also as shown in the column (C), the longitudinal vibrations by the voltages A, B occur in the contracting direction, and the mass points Y2 and Z2 show the maximum contraction around the node X, as indicated by the arrows. As a result, as shown in the column (D), the both vibrations are synthesized and the mass points Y and Z move counterclockwise from the state at the time $t_4$.

Also in a time frame $t_6$ to $t_9$, the bending and longitudinal vibrations are generated in the same principle as explained above, and, as shown in the column (D), the mass points Y and Z move counterclockwise to generate an elliptic motion.

Based on the above-explained principle, the ultrasonic actuator 10 generates an elliptic motion at the ends of the driving force extracting portions 11b, 11c, thereby generating a driving force. Consequently, when the relative moving member 20 is pressed to the ends of the driving force extracting portions 11b, 11c, a relative motion is generated between the ultrasonic actuator 10 and the relative moving member 20.

Figure 5:
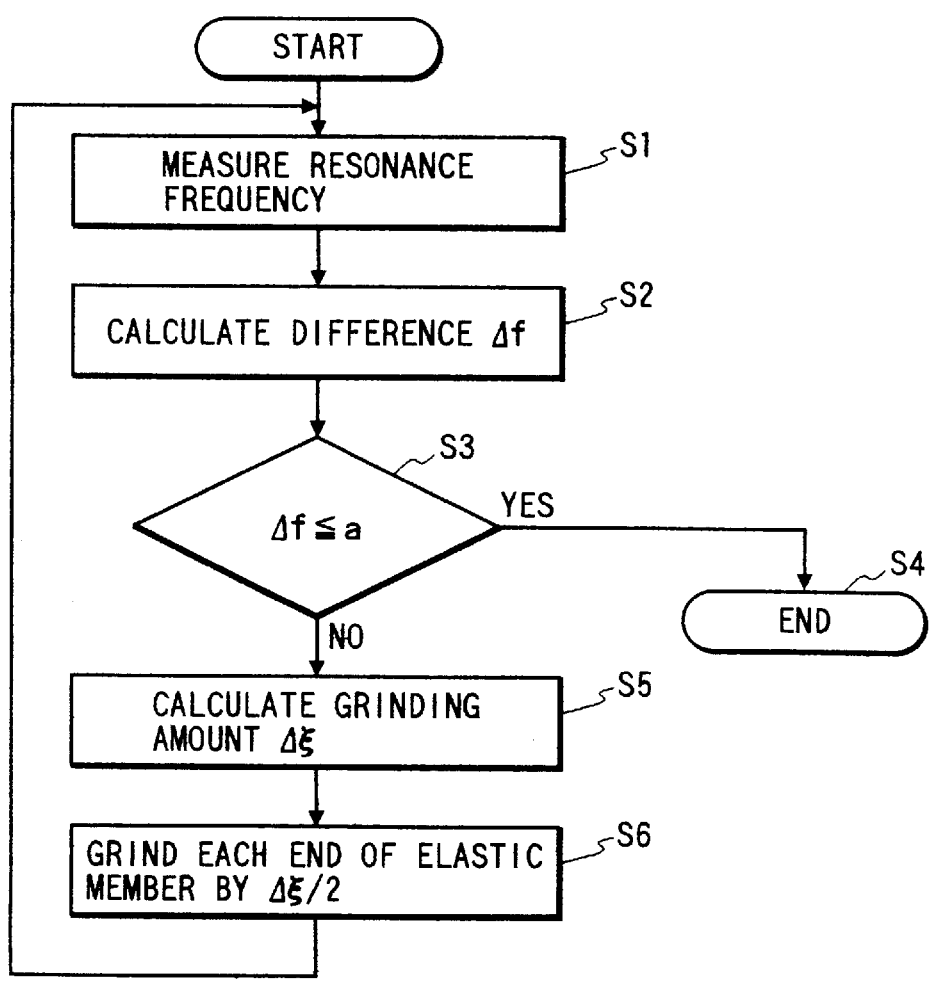
FIG. 5 is a flow chart showing a routine for determining the amount of grinding of the frequency adjusting portions of the ultrasonic actuator of the present invention.

FIG. 5 is a flow chart showing a routine for determining the amount of grinding of the frequency adjusting portions of the ultrasonic actuator of the present invention.

At first a step S1 measures, with an impedance analyzer, the resonance frequencies of the bending and longitudinal vibrations of the assembled ultrasonic actuator.

A step S2 calculates the difference $\Delta f$ of the two resonance frequencies measured in the step S1.

A step S3 compares $\Delta f$, calculated in the step S2, with a predetermined target value a, and the sequence proceeds to a step S4 or S5, respectively if $\Delta f \leq a$ or $\Delta f > a$.

A step S4 terminates the sequence without the grinding of the frequency adjusting portions 11d, 11e because the difference $\Delta f$ of the two resonance frequencies is within the predetermined range.

A step S5 calculates the grinding amount $\Delta \xi$ by a function $\Delta \xi = f(\Delta f)$, utilizing $\Delta f$ determined in the step S2. The function f is experimentally determined in advance.

A step S6 effects grinding of the frequency adjusting portions 11d, 11e of the elastic member 11 with a grinding tool such as a grinder, based on $\Delta \xi$ determined in the step S5. In this grinding operation, the frequency adjusting portions 11d, 11e are preferably ground respectively by $\Delta \xi / 2$, in order to maintain the symmetry of the vibration modes in the elastic member 11.

After the grinding of the elastic member 11 by $\Delta \xi$, the returns to the step S1 to again measure, with the impedance analyzer, the resonance frequencies of the bending and longitudinal vibrations of the ultrasonic actuator. Then the step S2 calculates the difference $\Delta f$. Subsequently the grinding is repeated in the same manner or terminated respectively if $\Delta f > a$ or $\Delta f \leq a$ in the step S3.

In the following there will be explained an example of the driving apparatus utilizing the ultrasonic actuator 10 of the present embodiment.

Figure 6A:
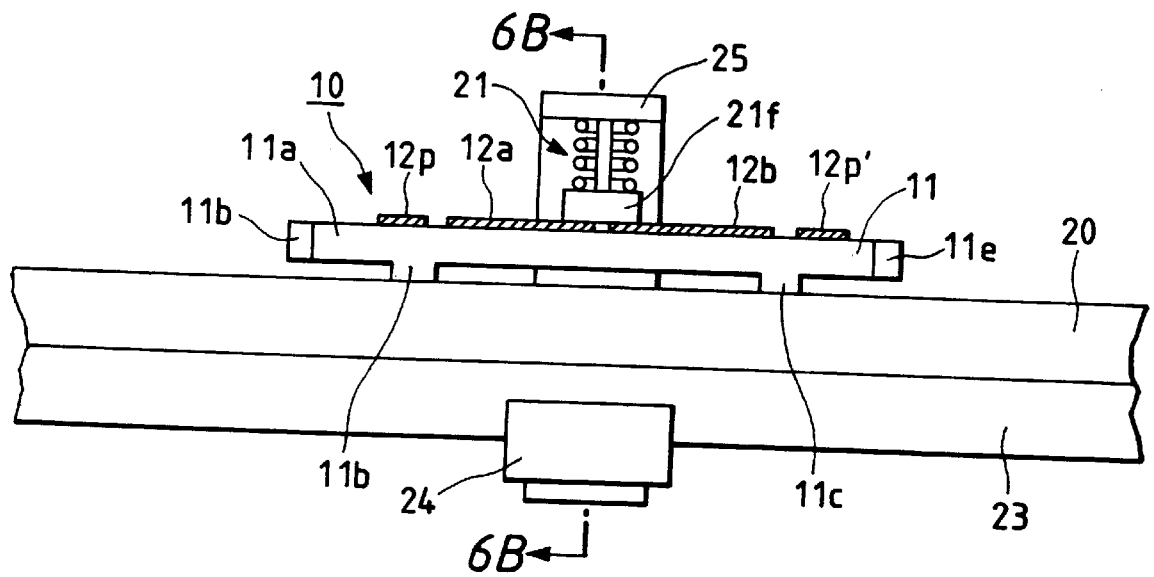
FIGS. 6A and 6B are respectively an elevation view and a cross-sectional view along a line 6B—6B in FIG. 6A, showing the entire configuration of a driving apparatus employing the ultrasonic actuator of the present invention.
Figure 6B:
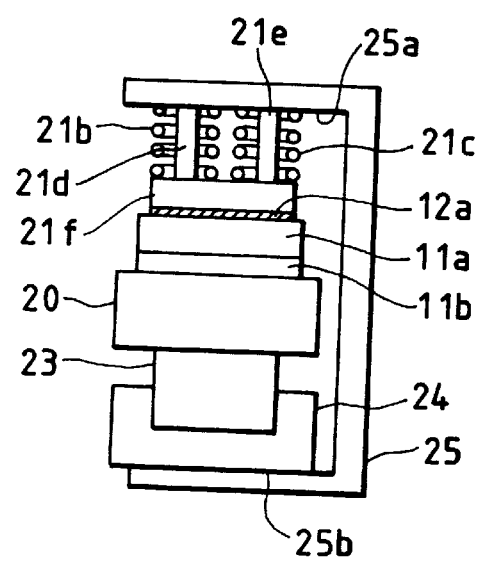

FIGS. 6A and 6B are respectively an elevation view and a cross-sectional view along a line 6B—6B in FIG. 6A, showing the entire configuration of a driving apparatus utilizing the ultrasonic actuator of the present invention, explained with reference to FIGS. 1 to 5.

In an ultrasonic actuator 10 of the present invention, provided with an elastic member 11 with an adhered piezoelectric element 12 and a relative moving member 20 maintained in contact with driving force extracting portions 11b, 11c formed in the elastic member 11, the elastic member 11 is pressed toward the relative moving member 20 by means of a pressing mechanism 21.

The ultrasonic actuator 10 of the present invention is provided between an internal surface 25a of a connecting member with a groove-shaped cross section and an external surface 23a of a linear guide rail 23 supported by a linear guide 24 with a groove-shaped cross section, which is fixed to an internal surface 25b opposed to the internal surface 25a.

In the pressing mechanism 21, ends of coil springs 21b, 21c and of guide rods 21d, 21e are fixed to the internal surface 25a of the connecting member 25, while the other ends are fixed to a pressure plate 21f, for pressing the elastic member 11 across the piezoelectric element 12. On the other hand, the relative moving member 20 and the linear guide rail 23 are mutually fixed, by screws in the present embodiment. The coil springs may be replaced for example by plate springs or dish springs.

In thus constructed driving apparatus, when a high-frequency voltage is applied to the piezoelectric element 12 to generate the elliptic motion in the elastic member 11;

(1) if the connecting member 25 is fixed, or namely if the ultrasonic actuator 10 does not move, the relative moving member 20 and the linear guide rail 23 integrally effect a relative motion; or (2) if the relative moving member 20 is fixed, or namely if the ultrasonic actuator 10 moves, the main body of the ultrasonic actuator, the connecting member 25 and the linear guide 24 integrally effect a relative motion.

Second embodiment

Figure 7:
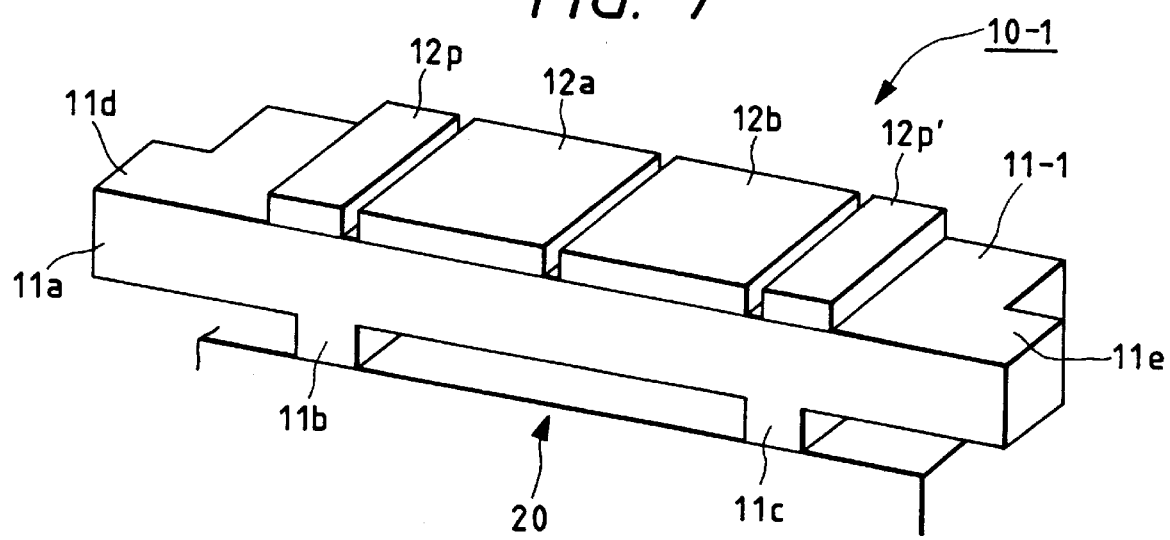
FIG. 7 is a perspective view of an ultrasonic actuator constituting a second embodiment of the present invention.

FIG. 7 is a perspective view of an ultrasonic actuator, constituting a second embodiment of the present invention.

In the following embodiments, there will only be explained the difference from the first embodiment, and portions equivalent to those in the first embodiment will be represented by corresponding numbers and will not be explained further.

In the elastic member 11-1 of the ultrasonic actuator 10-1 of this embodiment, the frequency adjusting portions 11d, 11e are not provided symmetrically with respect to the center line of the base portion 11a, but are in positions offset from the center line.

Even when the frequency adjusting portions 11d, 11e are provided in such positions, the grinding thereof allows to adjust the difference of the resonance frequencies of the bending and longitudinal vibrations generated in the elastic member 11.

The present invention is not limited to the foregoing first and second embodiments but is subject to various modifications and alterations, which are also included in the present invention.

FIGS. 8A to 8D are plan views showing variations of the frequency adjusting portions 11d, 11e, which are positioned symmetrically with respect to the center line m of the base portion 11a.

Figure 8A:
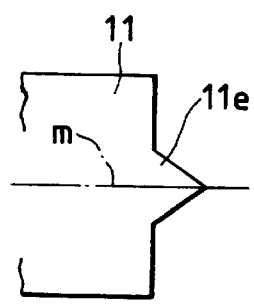
FIGS. 8A to 8D are plan views respectively showing variations of the frequency adjusting portions 11$d$, 11$e$ of the ultrasonic actuator of the present invention.
Figure 8B:
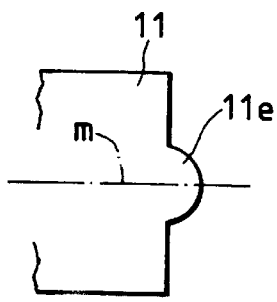
Figure 8C:
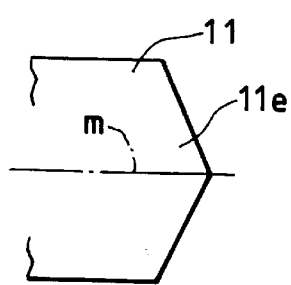
Figure 8D:
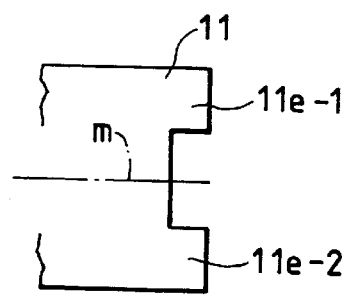

The frequency adjusting portion may be of a protruding triangular shape, in plan view, as shown in FIG. 8A, or a protruding semicircular shape as shown in FIG. 8B, or a triangular shape over the entire width as shown in FIG. 8C. Also as shown in FIG. 8D, there may be provided two frequency adjusting portions 11e-1, 11e-2 (each having a rectangular shape in plan view, in this embodiment) symmetrically to the center line m.

FIGS. 9A to 9D are plan views showing other embodiments of the frequency adjusting portions 11d, 11e, provided unsymmetrically with respect to the center line m of the base portion 11a.

Figure 9A:
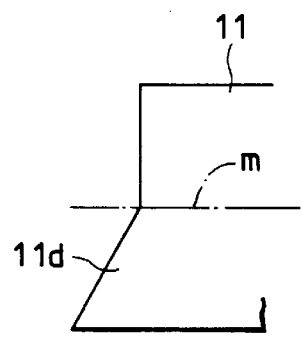
FIGS. 9A to 9D are plan views respectively showing variations of the frequency adjusting portions 11$d$, 11$e$ of the ultrasonic actuator of the present invention.
Figure 9B:
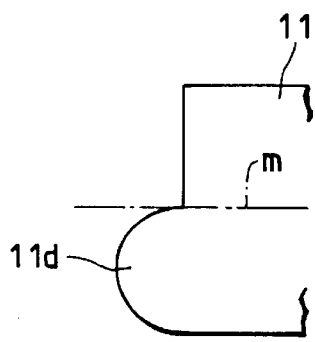
Figure 9C:
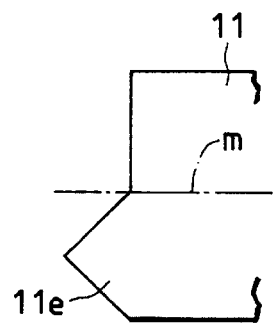
Figure 9D:
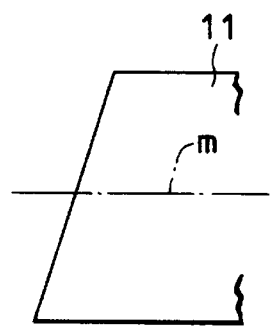

The frequency adjusting portion 11d may have, in plan view, a protruding regular triangular shape as shown in FIG. 9A, or a protruding semicircular shape as shown in FIG. 9B, or a protruding triangular shape with two equal sides as shown in FIG. 9C.

Also in these variations, the grinding of the frequency adjusting portion 11d allows adjustment of the difference of the resonance frequencies of the bending and longitudinal vibrations generated in the elastic member 11.

In the first and second embodiments, the frequency adjusting portions 11d, 11e are provided over the entire thickness of the base portion 11a, but they may also be provided in a part of the thickness. Such configuration is preferable for achieving more precise adjustment of the frequency, if the grinding amount can be limited.

Third embodiment

Figure 10:
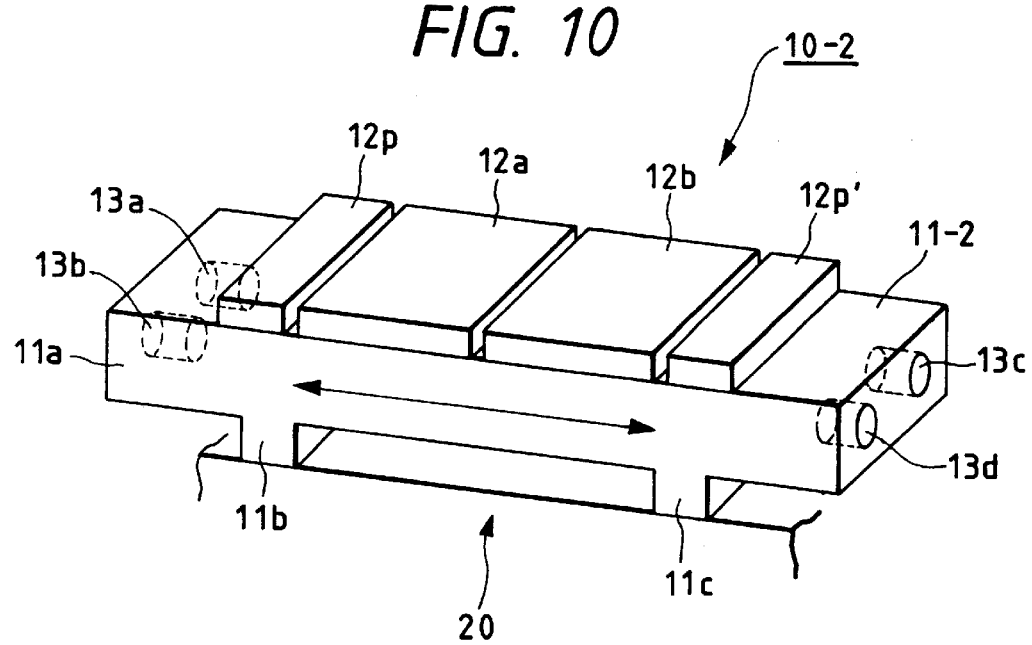
FIG. 10 is a perspective view of an ultrasonic actuator constituting a third embodiment of the present invention.

FIG. 10 is a perspective view of an ultrasonic actuator constituting a third embodiment of the present invention.

In the ultrasonic actuator 10-2 of this embodiment, the base portion 11a of the elastic member 11-2 is provided, on both end faces in the longitudinal direction, with four frequency adjusting holes 13a–13d in total, or two on each end face, constituting mass lacking portions for adjusting the difference of the resonance frequencies, so as to be parallel to the longitudinal direction.

The holes are formed in the present embodiment by laser beam irradiation, but such method is not limitative and there may be suitably selected other methods. Also the number of the holes is not limited to two on each end, and there may be provided one, three or more holes according to the desired margin of frequency adjustment. However they are preferably positioned symmetrically with respect to the center line parallel to the longitudinal direction of the base portion 11a, since such arrangement allows prediction of the variation rate of the frequency.

Figure 11:
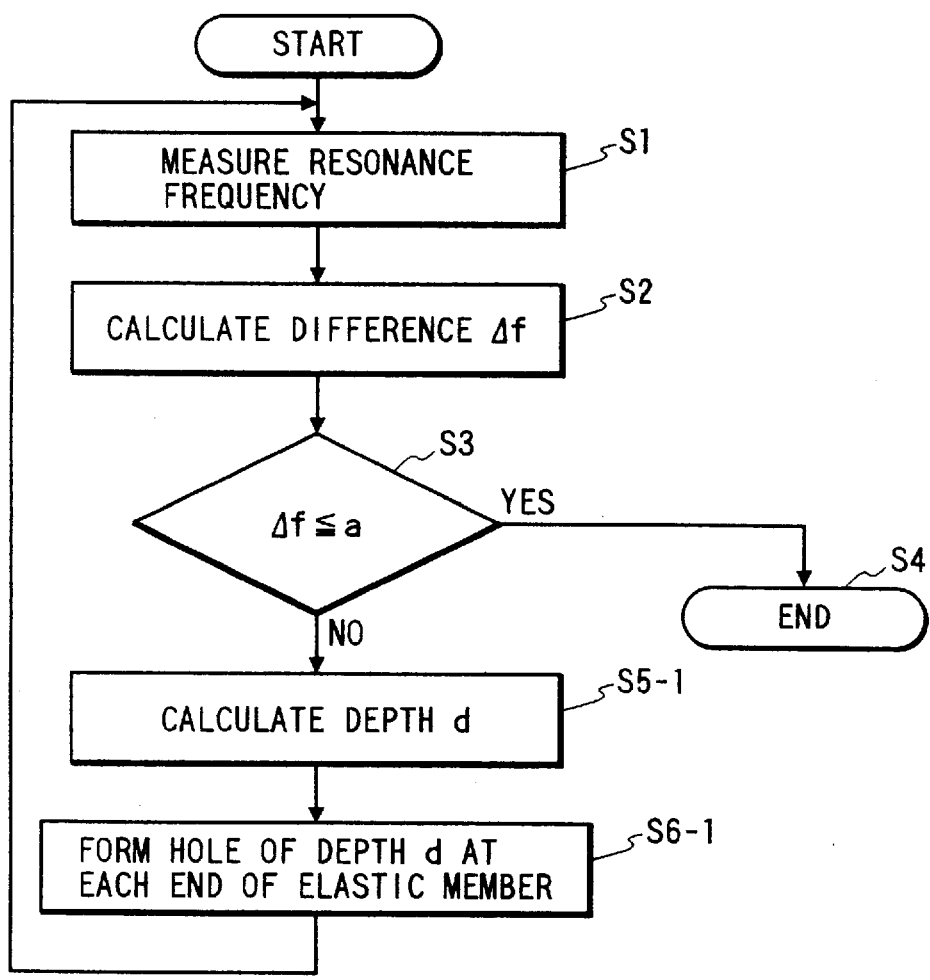
FIG. 11 is a flow chart showing a routine for determining the amount of grinding of the frequency adjusting portions of the ultrasonic actuator of the third embodiment.

FIG. 11 is a flow chart showing a routine for determining the depth of the frequency adjusting portion in the ultrasonic actuator of the present embodiment. It is basically the same as the flow chart in FIG. 5, but, in the present embodiment, it is necessary to determine the depth d of the frequency adjusting holes 13a–13d, in order to form such holes.

For this purpose a step S5-1 calculates the depth d by a function $d=f(\Delta f)$, utilizing $\Delta f$ determined in the step S2. The function f is experimentally determined in advance.

Then a step S6-1 forms the frequency adjusting holes 13a–13d, for example by laser beam irradiation, based on the depth d determined in the step S5-1.

After the formation of the frequency adjusting holes 13a–13d of the depth d in the elastic member 11, the sequence returns to the step S1 to again measure, with the impedance analyzer, the resonance frequencies of the bending and longitudinal vibrations of the ultrasonic actuator 10, and then the step S2 calculates the difference $\Delta f$. The grinding is repeated in the same manner or terminated, respectively if $\Delta f > a$ or $\Delta f \leq a$ in the step S3.

Also in this embodiment, the formation of the frequency adjusting holes 13a–13d reduces the equivalent length $\xi$ of the elastic member 11. The resonance frequencies of the longitudinal and bending vibrations generated in the elastic member 11, being given by the foregoing equations (1) and (2), are affected by the equivalent length $\xi$, respectively by −1st order and −2nd order, so that the frequency increasing rate is larger for the bending vibration than for the longitudinal vibration.

Figure 12A:
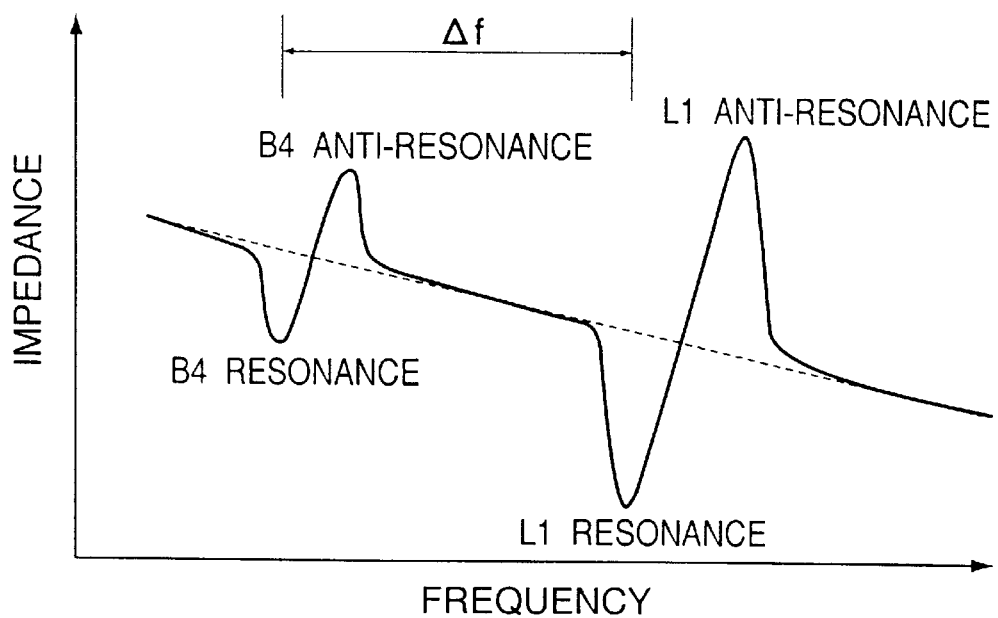
FIGS. 12A and 12B are graphs showing an example of the variation in the resonance frequencies of the longitudinal and bending vibrations in the third embodiments, by the relationship between the frequency and impedance of the elastic member, respectively prior to and after the adjustment.
Figure 12B:
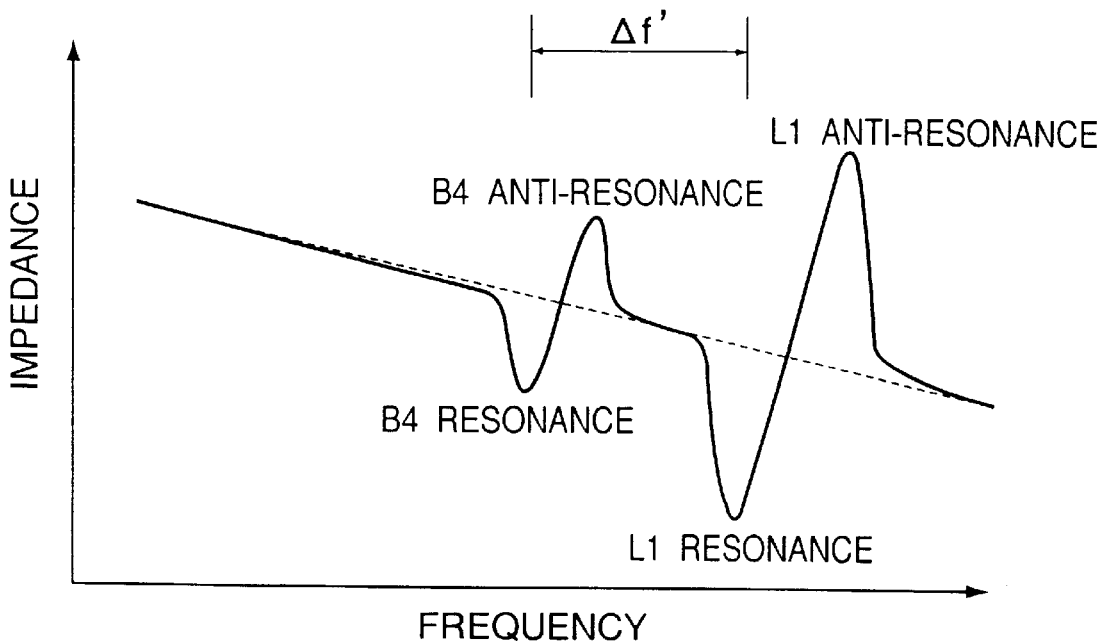

Consequently, in case the resonance frequency of the longitudinal vibration is larger than that of the bending vibration prior to the hole formation (adjustment) as shown in FIG. 12A, the frequencies vary respectively after the hole formation (adjustment) as shown in FIG. 12B, whereby the difference $\Delta f$ of the resonance frequencies changes to $\Delta f'$ ($<\Delta f$).

Fourth embodiment

Figure 13:
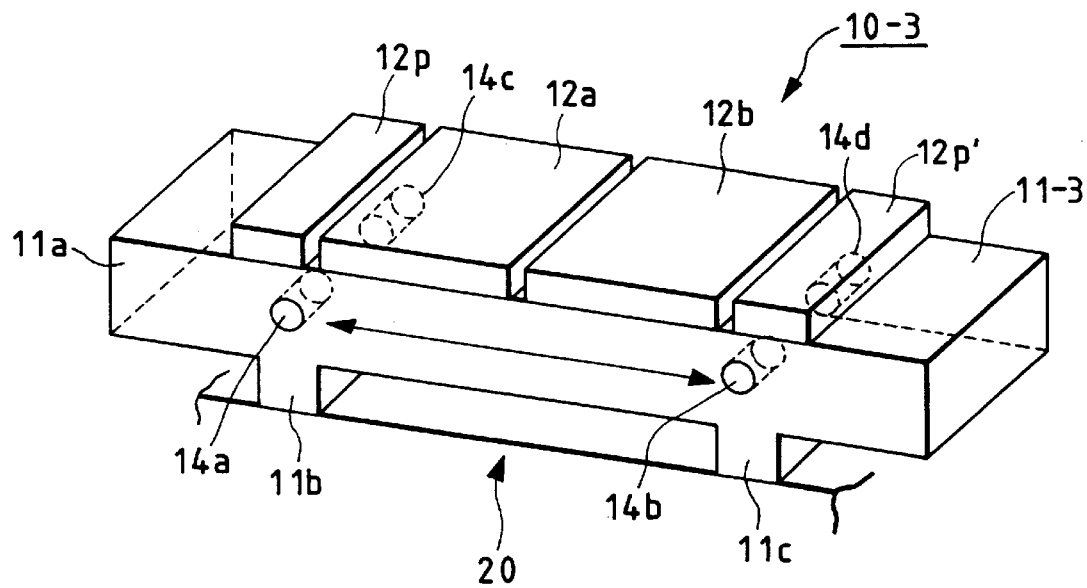
FIG. 13 is a perspective view of an ultrasonic actuator constituting a fourth embodiment of the present invention.

FIG. 13 is a perspective view of an ultrasonic actuator constituting a fourth embodiment of the present invention.

In the ultrasonic actuator 10-3 of this embodiment, the base portion 11a of the elastic member 11-3 is provided, on lateral surfaces in the longitudinal direction of the base portion 11a, with four frequency adjusting holes 14a–14d in total, or two on each lateral surface, constituting mass lacking portions for adjusting the difference of the resonance frequencies, so as to be parallel to a direction perpendicular to the longitudinal direction.

The hole forming method is similar to that in the third embodiment. Also the number of the holes is not limited to two on each lateral surface, and there may be provided one, three or more holes according to the desired margin for frequency adjustment. However they are preferably positioned symmetrically with respect to the center line perpendicular to the longitudinal direction of the base portion 11a, in order to facilitate the prediction of the variation rate of the frequency.

Also in the present embodiment, the formation of the frequency adjusting holes 14a–14d reduces the equivalent length ξ of the elastic member 11, but the rigidity of the elastic member 11 is lowered at the same time to reduce the Young's modulus in each vibrating direction. The resonance frequencies of the longitudinal and bending vibrations generated in the elastic member 11, being given by the foregoing equations (1) and (2), are affected by the equivalent length ξ, respectively by −1st order and −2nd order. Also the decrease of the Young's modulus affecting the bending vibration is larger than that affecting the longitudinal vibration. Consequently the frequency decreasing rate for the bending vibration is larger than that for the longitudinal vibration.

Figure 14A:
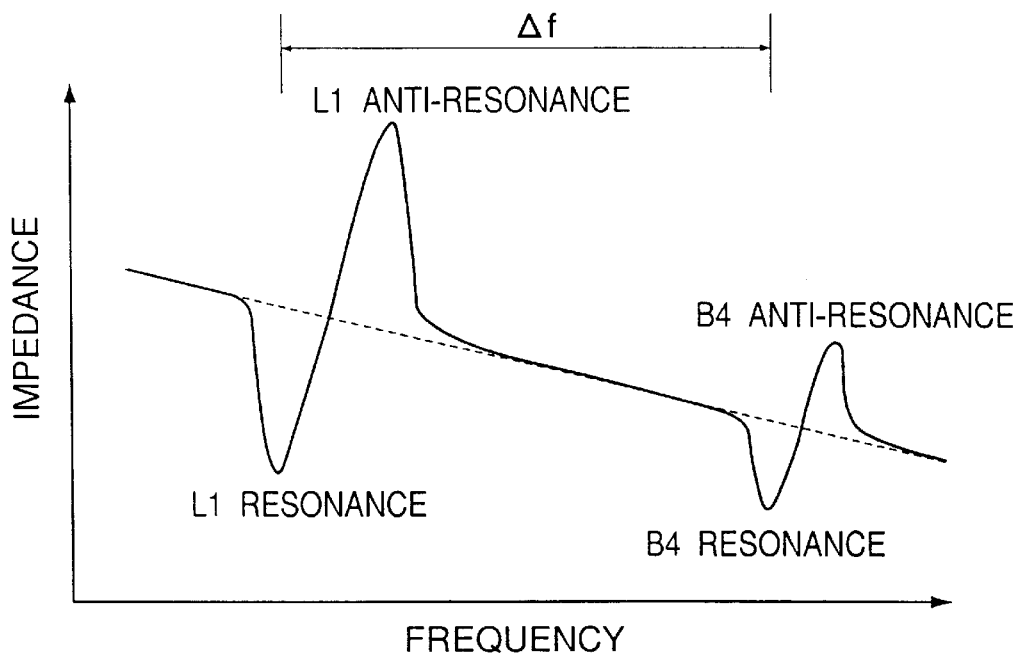
FIGS. 14A and 14B are graphs showing an example of the variation in the resonance frequencies of the longitudinal and bending vibrations in the fourth embodiment, by the relationship between the frequency and impedance of the elastic member, respectively prior to and after the adjustment.
Figure 14B:
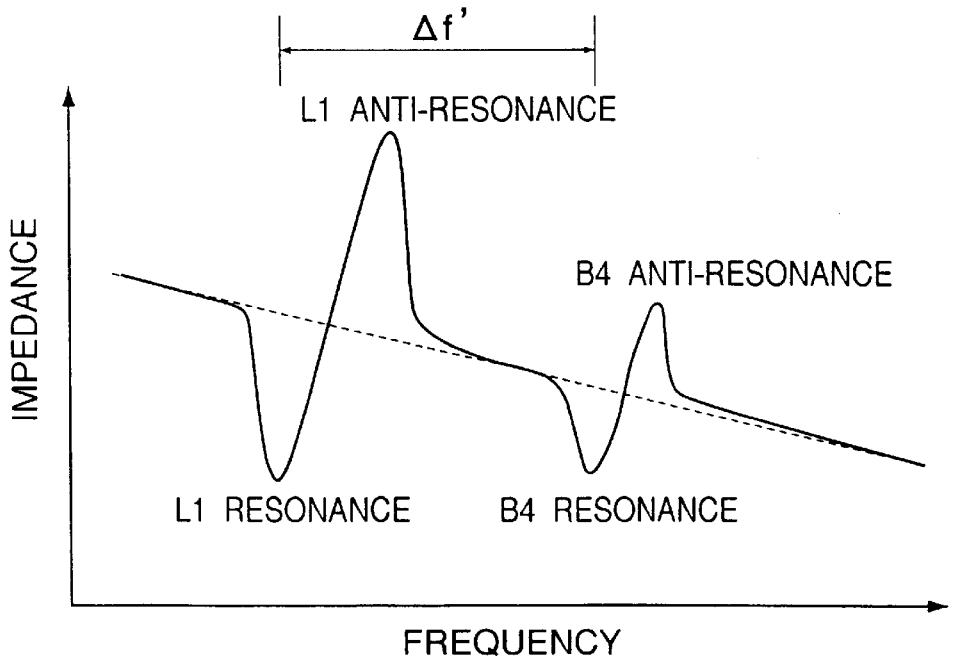

Therefore, in case the resonance frequency of the bending vibration is larger than that of the longitudinal vibration prior to the hole formation (adjustment) as shown in FIG. 14A, the frequencies vary respectively after the hole formation (adjustment) as shown in FIG. 14B, whereby the difference Δf of the resonance frequencies changes to Δf' (<Δf).

Also the resonance frequency of the longitudinal vibration can be made larger than that of the bending vibration, by increasing the depth of the frequency adjusting holes 14a–14d.

The vibration of the resonance frequency of the bending vibration becomes particularly large, if the frequency adjusting holes 14a–14d are positioned at the antinodes of the bending vibration.

Fifth embodiment

Figure 15:
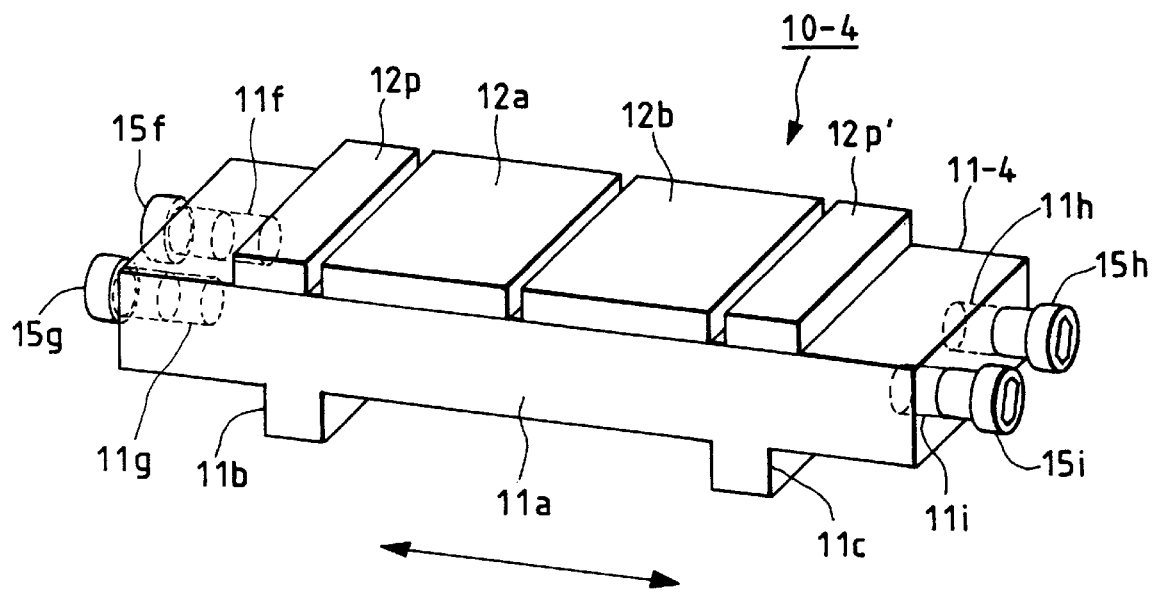
FIG. 15 is a perspective view of an ultrasonic actuator constituting a fifth embodiment of the present invention.

FIG. 15 is a perspective view of an ultrasonic actuator, constituting a fifth embodiment of the present invention.

In the ultrasonic actuator 10-4 of this embodiment, the elastic member 11-4 is provided in advance, on the end faces thereof, with mounting holes 11f, 11g, 11h, 11i for frequency adjusting members, symmetrically with respect to the center line parallel to the longitudinal direction (indicated by a both-ended arrow) of the elastic member 11-4.

In the present embodiment, the mounting holes for the frequency adjusting members are composed of threaded holes 11f–11i, in which screws 15f, 15g, 15h, 15i constituting the frequency adjusting members are screwed in, but the present invention is not limited to such embodiment. For example, the mounting holes may be composed of drilled holes 11f'–11i', into which pins 15f'–15i' constituting the frequency adjusting members may be fitted.

Such holes 11f–11i may be formed with suitable means (for example drill or laser beam irradiation), according to the frequency adjusting members to be mounted. As the mounting holes 11f–11i may be formed without the use of a grinder, this embodiment enables adjustment of the resonance frequencies, without detrimental influence on the elastic member 11-4 or on the piezoelectric element 12.

In the ultrasonic actuator 10-4 of the present embodiment, the resonance frequencies of the longitudinal 1st-order vibration and the bending 4th-order vibration are adjusted by mounting the screws 15f–15i, constituting the frequency adjusting members, into the threaded holes 11f–11i. More specifically, the mounting of the screws 15f–15i onto the elastic member 11-4 increases the equivalent length ξ of the elastic member 11-4, corresponding to the mass increase by the screws 15f–15i.

By screwing the screws 15f–15i into the threaded holes 11f–11i formed on the end faces, in the longitudinal direction, of the elastic member 11-4, the equivalent length ξ increases to (ξ+Δξ) in the foregoing equations (1) and (2).

The resonance frequencies of the longitudinal and bending vibrations, given by the equations (1) and (2), both decrease but the rate of decrease is larger for the bending vibration in which the equivalent length ξ with a higher order.

Figure 16A:
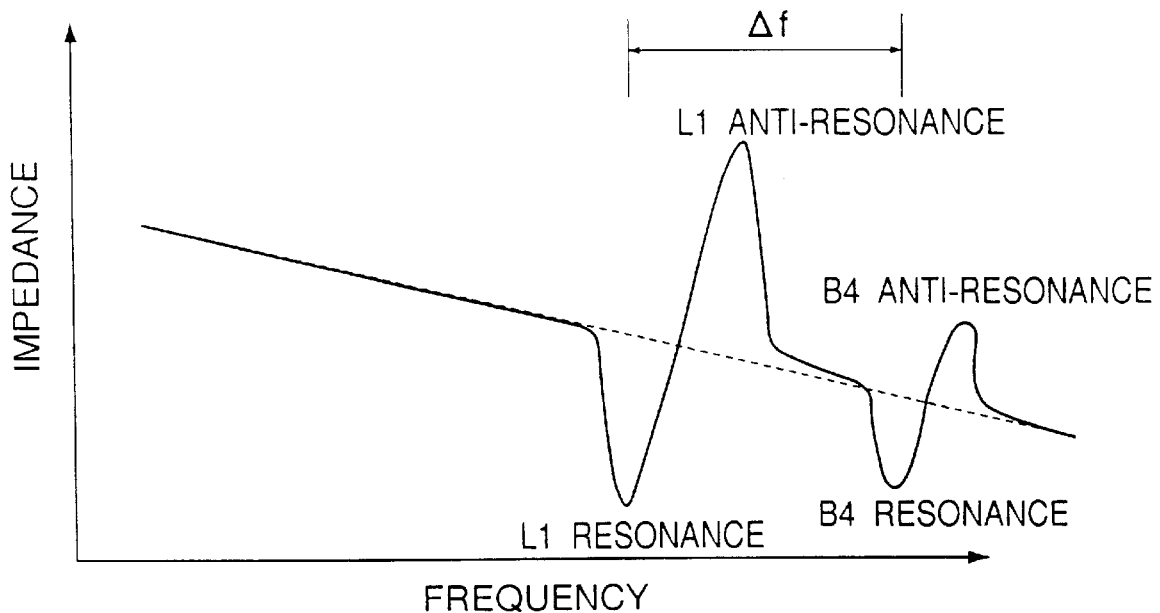
FIGS. 16A and 16B are graphs showing an example of the variation in the resonance frequencies of the longitudinal and bending vibrations in the fifth embodiment, by the relationship between the frequency and impedance of the elastic member, respectively prior to and after the screw mounting.
Figure 16B:
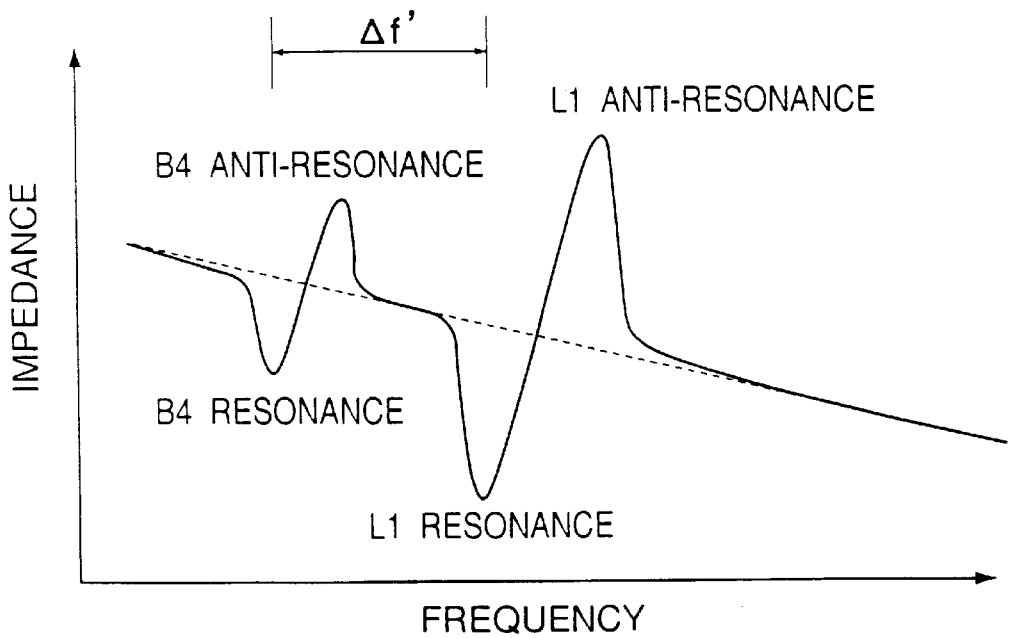

FIGS. 16A and 16B are graphs showing an example of the variation in the resonance frequencies of the longitudinal and bending vibrations, by the relationship between the frequency and impedance of the elastic member 1, respectively prior to and after the mounting.

Prior to the mounting of the screws 15f–15i onto the ultrasonic actuator 10-4 bearing the piezoelectric element 12 and the wirings (cf. FIG. 16A), the resonance frequency of the bending vibration (B4 mode) is larger, by Δf, than that of the longitudinal vibration (L1 mode), but the mounting of the screws 15f–15i reduces both resonance frequencies as shown in FIG. 16B, with a decreasing rate for the bending vibration (B4 mode) larger that for the longitudinal vibration (L1 mode), so that the magnitudes of the resonance frequencies are inverted with a resulting difference Δf' (<Δf). In this manner the adjustment is so made as to reduce the difference of the resonance frequencies of the longitudinal and bending vibrations.

In this embodiment, finer adjustment is possible by preparing screws 15f–15i of various kinds different in the length and weight, or by varying the screwing lengths of the screws 15f–15i.

However, as the adjusting method for the ultrasonic actuator of this embodiment has the effect of increasing the equivalent length ξ of the elastic member 11-4, it is so designed in advance, as shown in FIG. 16B, that the resonance frequency of the bending vibration is higher than that of the longitudinal vibration.

The present embodiment is applicable also to an elastic member which has holes on the end faces thereof for the purpose of frequency adjustment but cannot achieve desired frequency adjustment because of the excessively large size of the holes. More specifically, in case the resonance frequencies are inverted by the hole formation on the end faces of the elastic member, it is rendered possible to effect a fine adjustment resolving such inversion of the resonance frequencies, by inserting the frequency adjusting members into such holes.

Figure 17:
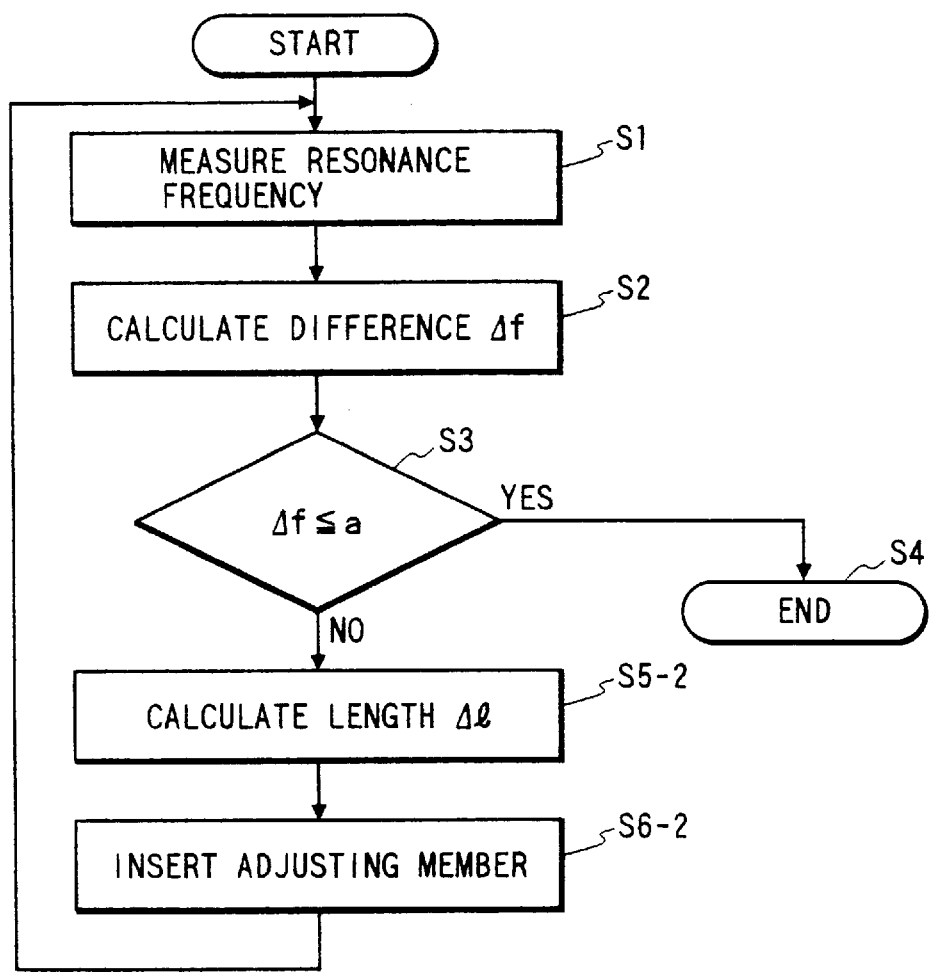
FIG. 17 is a flow chart showing a routine for determining the length of the frequency adjusting members to be mounted on the elastic member of the ultrasonic actuator of the fifth embodiment.

FIG. 17 is a flow chart showing a routine for determining the length of the frequency adjusting members to be mounted on the elastic member of the ultrasonic actuator of the present embodiment. This flow chart is basically same as that shown in FIG. 5, except for the determination of the length Δ1 of the frequency adjusting members.

A step S5-2 calculates the length Δ1 of the frequency adjusting members by a function Δ1=f(Δf), utilizing the difference Δ1 determined in the step S2. The function f is experimentally determined in advance.

Then a step S6-2 mounts the frequency adjusting members 15f–15i respectively in the mounting holes 11f–11i, based on Δ1 determined in the step S5-2.

After the mounting of the frequency adjusting members 15f–15i on the elastic member 11-4, the sequence returns to the step S1 to again measure, with the impedance analyzer, the resonance frequencies of the bending and longitudinal vibrations of the ultrasonic actuator 10-4, and the step S2 calculates the difference Δ1. Then the step S3 calculates the length Δξ of the frequency adjusting members in the same manner or terminates the sequence respectively if Δf>a or Δf≦a.

Sixth embodiment

Figure 18:
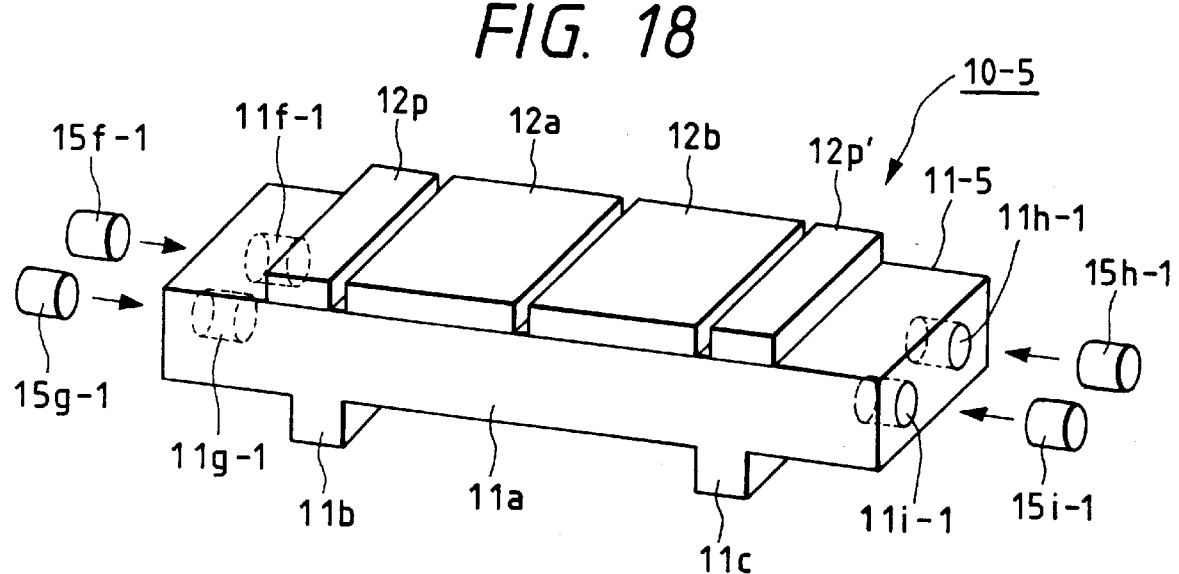
FIG. 18 is a perspective view of an ultrasonic actuator constituting a sixth embodiment of the present invention.

FIG. 18 is a perspective view of an ultrasonic actuator constituting a sixth embodiment of the present invention.

The ultrasonic actuator 10-5 of the present embodiment employs pins 15*f*-1, 15*g*-1, 15*h*-1 and 15*i*-1, and is provided with corresponding mounting holes 11*f*-1, 11*g*-1, 11*h*-1 and 11*i*-1.

The pins 15*f*-1–15*i*-1 may be fitted in or adhered to the holes 11*f*–11*i*-1.

Also the present embodiment allows adjustment, as in the fifth embodiment, of the difference of the resonance frequencies of the bending and longitudinal vibrations generated in the elastic member 11-5.

Figure 19A:
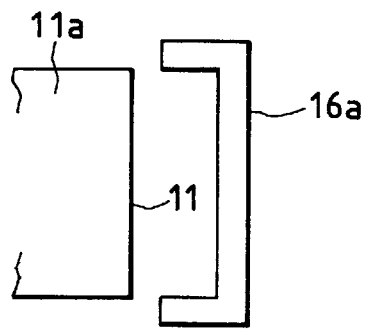
FIGS. 19A to 19C are plan views respectively showing variations of the frequency adjusting members.
Figure 19B:
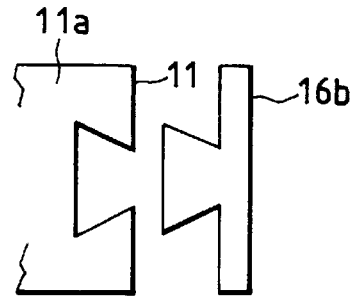
Figure 19C:
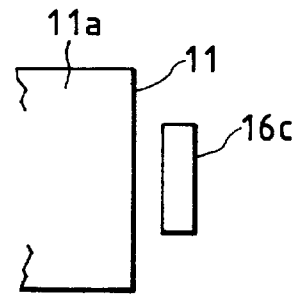
Figure 20:
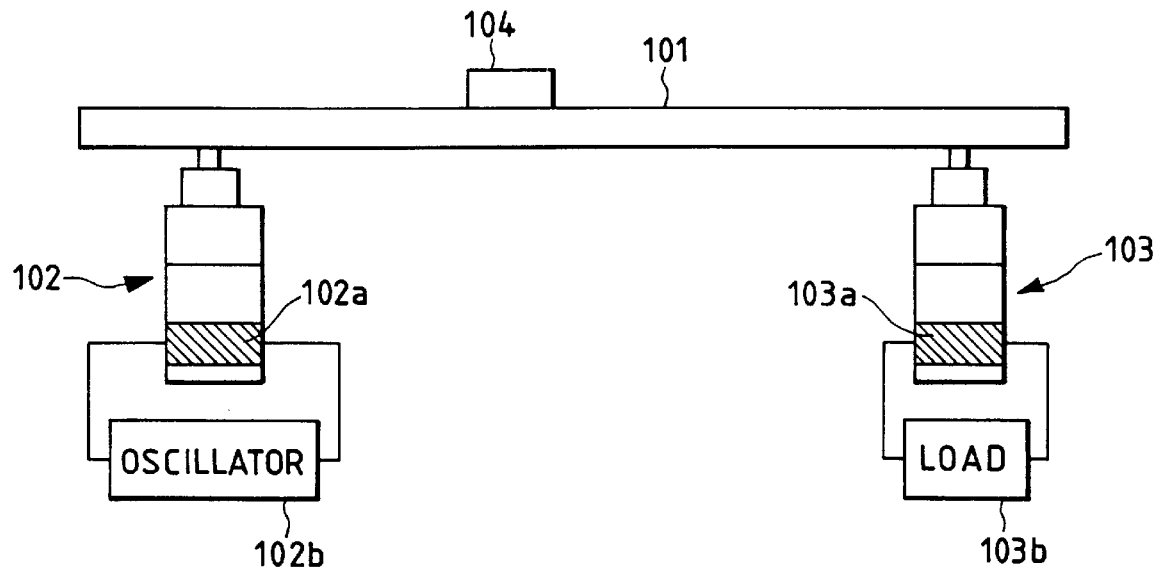
FIG. 20 is a schematic view of a conventional linear ultrasonic actuator.
Figure 21A:
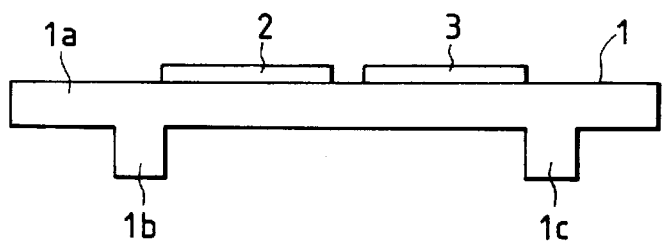
FIGS. 21A, 21B and 21C are respectively an elevation view, a lateral view and a plan view schematically showing a conventional longitudinal-L1 bending-B4 mode flat-plate motor.
Figure 21B:
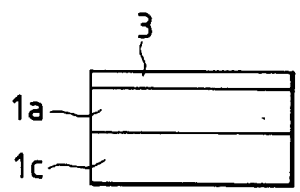
Figure 21C:
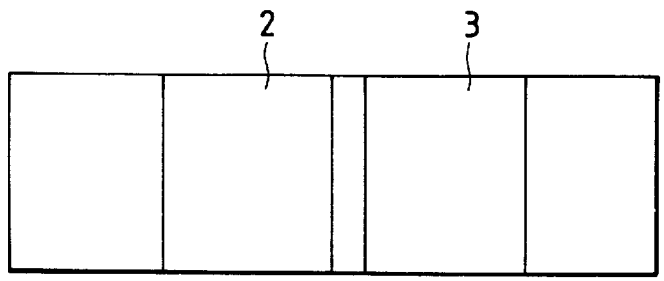
Figure 22:
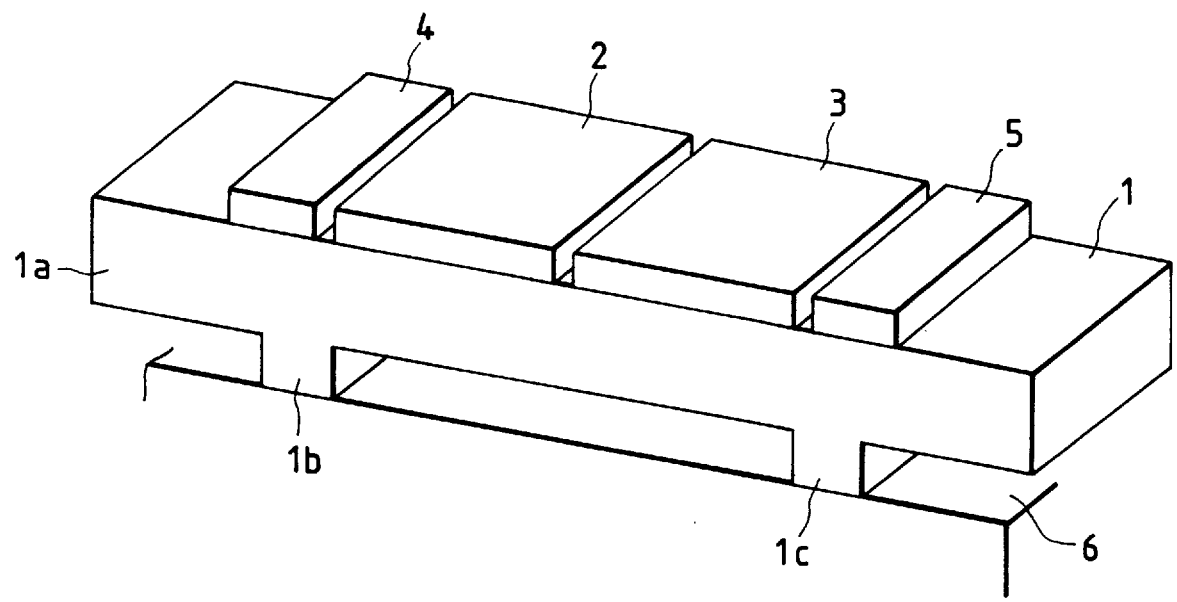
FIG. 22 is a perspective view of the longitudinal-L1 bending-B4 mode flat-plate motor shown in FIGS. 21A to 21C.

FIGS. 19A to 19C are plan views showing variations of the frequency adjusting members.

It is also possible to mount a frequency adjusting member 16*a* of a grooved plan shape on the base portion 11*a* by adhesion or fitting as shown in FIG. 19A, or to mount a frequency adjusting member 16*b* having a fantail tenon-shaped protruding portion on the base portion by fitting as shown in FIG. 19B, or to adhere a frequency adjusting member 16*c* having a rectangular plan shape to the base portion 11*a*.

The fifth and sixth embodiments enable easy and secure adjustment of the difference of the resonance frequencies of the longitudinal and bending vibrations without detrimental influence on the elastic member or the piezoelectric elements.

Also, even for the elastic member showing inversion of the resonance frequencies by the adjustment with hole formation, there can be conducted again a fine adjustment for resolving such inversion of the resonance frequencies.

As explained in the foregoing, the adjustment method of the present invention for the vibration actuator allows to resolve the deterioration of the performance of the vibration actuator, resulting from the error in the working process. Consequently, in the mass production of the vibration actuator, it is rendered possible to improve the yield and to improve the driving characteristics of the vibration actuator.

The present invention is not limited to the foregoing first to sixth embodiments but is subjected to various modifications and alterations, which are also included in the present invention.

For example, the foregoing embodiments employ a piezoelectric element as the electromechanical converting element, but the present invention is not limited to such embodiments and can employ any element that converts the electrical energy into the mechanical displacement. For example, there can be employed an electrostriction element or a magnetostriction element.

Also the first to sixth embodiments are limited to the ultrasonic actuator utilizing a longitudinal 1st-order vibration and a bending 4th-order vibration, but a similar method may be employed in the adjustment of the resonance frequencies in vibration actuators utilizing a longitudinal n-th order vibration (n being a natural number) and a bending m-th order vibration (m being a natural number).

Therefore, it is intended that the invention not be limited to the preferred embodiments described herein, but that the invention will include all embodiments falling within the scope of the appended claims.

What is claimed is:

1. A vibration actuator comprising:
    an elastic member of which a surface bears an electromechanical converting element adhered thereto; and
    a relative moving member maintained in pressure contact with the other surface of said elastic member;
    wherein a drive signal is applied to excite said electromechanical converting element to generate, in said elastic member, a longitudinal vibration vibrating in a plane parallel to the surface of said elastic member contacting said relative moving member and a bending vibration vibrating in a direction crossing said contacting surface, thereby generating a relative motion between said elastic member and said relative moving member, and wherein a resonance frequency of said longitudinal vibration generated in said elastic member is higher than a resonance frequency of said bending vibration generated in said elastic member, said elastic member including:
        working portions for adjusting the difference in the resonance frequencies of said longitudinal and bending vibrations, so that the resonance frequency of said longitudinal vibration is higher than the resonance frequency of said bending vibration by a predetermined value.

2. A vibration actuator comprising:
    an elastic member of which a surface bears an electromechanical converting element adhered thereto; and
    a relative moving member maintained in pressure contact with the other surface of said elastic member;
    wherein a drive signal is applied to excite said electromechanical converting element to generate, in said elastic member, a longitudinal vibration vibrating in a plane parallel to the surface of said elastic member contacting said relative moving member and a bending vibration vibrating in a direction crossing said contacting surface, thereby generating a relative motion between said elastic member and said relative moving member, and wherein a resonance frequency of said longitudinal vibration generated in said elastic member is higher than a resonance frequency of said bending vibration generated in said elastic member, said elastic member including:
        frequency adjusting portions protruding from end faces, in the longitudinal direction, of said elastic member and adapted to be reduced in the length in said longitudinal direction, thereby adjusting the difference in the resonance frequencies of said longitudinal and bending vibrations, so that the resonance frequency of said longitudinal vibration is higher than the resonance frequency of said bending vibration by a predetermined value.

3. A vibration actuator according to claim 2, wherein said frequency adjusting portions are provided symmetrically with respect to the center line of said elastic member which is parallel to said longitudinal direction thereof.

4. A vibration actuator comprising:
    an elastic member of which a surface bears an electromechanical converting element adhered thereto; and
    a relative moving member maintained in pressure contact with the other surface of said elastic member;
    wherein a drive signal is applied to excite said electromechanical converting element to generate, in said elastic member, a longitudinal vibration vibrating in a plane parallel to the surface of said elastic member contacting said relative moving member and a bending vibration vibrating in a direction crossing said contacting surface, thereby generating a relative motion between said elastic member and said relative moving member, and wherein a resonance frequency of said longitudinal vibration generated in said elastic member is higher than a resonance frequency of said bending vibration generated in said elastic member, said elastic member including:

mass locking portions provided on end faces and/or lateral faces, in the longitudinal direction, of said elastic member and adapted to reduce the mass of said elastic member, thereby adjusting the difference in the resonance frequencies of said longitudinal and bending vibrations, so that the resonance frequency of said longitudinal vibration is higher than the resonance frequency of said bending vibration by a predetermined value.

5. A vibration actuator according to claim 4, wherein said mass lacking portions on said lateral faces are provided in positions corresponding to the antinodes of said bending vibration.

6. An adjusting method for a vibration actuator in which a drive signal is applied to excite an electromechanical converting element adhered to a surface of an elastic member to generate a longitudinal vibration vibrating in a plane parallel to the other surface of said elastic member contacting a relative moving member maintained in pressure contact with the other surface and a bending vibration vibrating in a direction crossing said contacting surface, thereby generating a relative motion between said elastic member and said relative moving member, and wherein a resonance frequency of said longitudinal vibration generated in said elastic member is higher than a resonance frequency of said bending vibration generated in said elastic member, the adjusting method comprising the step of:

working said elastic member to adjust the difference in the resonance frequencies of said longitudinal and bending vibrations, so that the resonance frequency of said longitudinal vibration is higher than the resonance frequency of said bending vibration by a predetermined value.

7. An adjusting method for a vibration actuator in which a drive signal is applied to excite an electromechanical converting element adhered to a surface of an elastic member to generate a longitudinal vibration vibrating in a plane parallel to the other surface of said elastic member contacting a relative moving member maintained in pressure contact with the other surface and a bending vibration vibrating in a direction crossing said contacting surface, thereby generating a relative motion between said elastic member and said relative moving member, and wherein a resonance frequency of said longitudinal vibration generated in said elastic member is higher than a resonance frequency of said bending vibration generated in said elastic member, the adjusting method comprising the step of:

reducing the length, in the longitudinal direction, of frequency adjusting portions provided on the end faces, in said longitudinal direction, of said elastic member, thereby adjusting the difference in the resonance frequencies of said longitudinal and bending vibrations, so that the resonance frequency of said longitudinal vibration is higher than the resonance frequency of said bending vibration by a predetermined value.

8. An adjusting method for the vibration actuator according to claim 7, wherein said frequency adjusting portions are provided symmetrically with respect to the center line of said elastic member which is parallel to said longitudinal direction thereof.

9. An adjusting method for a vibration actuator in which a drive signal is applied to excite an electromechanical converting element adhered to a surface of an elastic member to generate a longitudinal vibration vibrating in a plane parallel to the other surface of said elastic member contacting a relative moving member and a bending vibration vibrating in a direction crossing said contacting surface, thereby generating a relative motion between said elastic member and said relative moving member, and wherein a resonance frequency of said longitudinal vibration generated in said elastic member is higher than a resonance frequency of said bending vibration generated in said elastic member, the adjusting method comprising the step of:

providing on the end faces and/or the lateral faces, in the longitudinal direction, of said elastic member, with mass lacking portions for reducing the mass of said elastic member, thereby adjusting the difference in the resonance frequencies of said longitudinal and bending vibrations, so that the resonance frequency of said longitudinal vibration is higher than the resonance frequency of said bending vibration by a predetermined value.

10. An adjusting method for the vibration actuator according to claim 9, wherein said mass lacking portions, if provided on said lateral faces, are provided in positions corresponding to the antinodes of said bending vibration.

* * * * *